US010015636B2

(12) United States Patent
Tsuda

(10) Patent No.: US 10,015,636 B2
(45) Date of Patent: *Jul. 3, 2018

(54) TECHNIQUES FOR OBTAINING AND DISPLAYING COMMUNICATION QUALITY INFORMATION

(71) Applicant: Sony Corporation, Tokyo (JP)

(72) Inventor: Shinichiro Tsuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/191,380

(22) Filed: Jun. 23, 2016

(65) Prior Publication Data

US 2016/0345134 A1 Nov. 24, 2016

Related U.S. Application Data

(63) Continuation of application No. 14/416,290, filed as application No. PCT/JP2013/004517 on Jul. 24, 2013, now Pat. No. 9,408,027.

(30) Foreign Application Priority Data

Jul. 31, 2012 (JP) .................................. 2012-169475

(51) Int. Cl.
H04L 12/26 (2006.01)
H04L 5/00 (2006.01)
(Continued)

(52) U.S. Cl.
CPC ........ *H04W 4/029* (2018.02); *G01C 21/3697* (2013.01); *H04B 17/23* (2015.01);
(Continued)

(58) Field of Classification Search
CPC ... H04W 4/02; H04W 4/028; H04W 28/0236; H04W 28/18; H04W 64/00; H04W 88/02; H04B 17/23; H04B 17/309; H04B 17/318; H04L 1/00; H04L 5/006; H04L 43/045; H04L 43/0888; H04L 43/16; H04M 1/00; G01C 21/20; G01C 21/3453; G01C 21/3461; G01C 21/36; G01C 21/3667; G01C 21/3697
(Continued)

(56) References Cited

U.S. PATENT DOCUMENTS 8,285,310 B1 * 10/2012 Shrum, Jr. ............ H04W 48/18
455/457
9,086,291 B1 * 7/2015 Bhatia ................ G01C 21/3453
(Continued)

FOREIGN PATENT DOCUMENTS

JP 2012-109742 A 6/2012

*Primary Examiner* — Michael Mapa
(74) *Attorney, Agent, or Firm* — Wolf, Greenfield & Sacks, P.C.

(57) ABSTRACT

A mobile device comprising at least one processor configured to perform acts of obtaining position information for at least first and second positions of the mobile device along a route; obtaining communication quality information for at least a third position of the mobile device, the communication quality information calculated based on the route and the obtained position information; and causing the mobile device to display the obtained communication quality information.

22 Claims, 21 Drawing Sheets

(51) Int. Cl.

| | |
|---|---|
| *H04B 17/318* | (2015.01) |
| *H04W 28/02* | (2009.01) |
| *H04L 1/20* | (2006.01) |
| *H04B 17/23* | (2015.01) |
| *H04B 17/309* | (2015.01) |
| *G01C 21/36* | (2006.01) |
| *H04W 88/02* | (2009.01) |
| *H04L 1/00* | (2006.01) |
| *H04W 28/18* | (2009.01) |
| *H04W 64/00* | (2009.01) |
| *H04W 4/029* | (2018.01) |
| *H04W 4/02* | (2018.01) |

(52) U.S. Cl.
CPC ......... *H04B 17/309* (2015.01); *H04B 17/318* (2015.01); *H04L 1/20* (2013.01); *H04L 5/006* (2013.01); *H04L 43/0888* (2013.01); *H04L 43/16* (2013.01); *H04W 4/02* (2013.01); *H04W 4/028* (2013.01); *H04W 28/0236* (2013.01); *H04L 1/0003* (2013.01); *H04L 1/0009* (2013.01); *H04W 28/18* (2013.01); *H04W 64/00* (2013.01); *H04W 88/02* (2013.01)

(58) Field of Classification Search
USPC ............... 455/134–135, 161.3, 277.2, 404.2, 455/414.1–414.2, 456.1–457
See application file for complete search history.

(56) References Cited

U.S. PATENT DOCUMENTS

| | | | |
|---|---|---|---|
| 2002/0029108 | A1 | 3/2002 | Liu et al. |
| 2004/0166862 | A1 | 8/2004 | Voyer |
| 2004/0203998 | A1* | 10/2004 | Knauerhase ......... H04W 36/32 455/550.1 |
| 2004/0208183 | A1 | 10/2004 | Balachandran et al. |
| 2006/0047815 | A1 | 3/2006 | Hamadi |
| 2006/0259236 | A1* | 11/2006 | Kaplan ................. G01C 21/26 701/532 |
| 2007/0211676 | A1* | 9/2007 | Sharma ................. H04W 16/18 370/338 |
| 2008/0176554 | A1 | 7/2008 | Gibbons et al. |
| 2008/0195306 | A1* | 8/2008 | Moinzadeh ...... G08G 1/096811 701/420 |
| 2009/0228199 | A1* | 9/2009 | Bhogal ............. G01C 21/3461 701/425 |
| 2009/0247137 | A1* | 10/2009 | Awad ................. H04M 3/2227 455/418 |
| 2011/0144899 | A1* | 6/2011 | Soelberg ........... G01C 21/3461 701/532 |
| 2011/0244859 | A1 | 10/2011 | Tsuda |
| 2011/0292812 | A1 | 12/2011 | Kim et al. |
| 2012/0262335 | A1 | 10/2012 | Holcman et al. |
| 2012/0314590 | A1 | 12/2012 | Choudhury et al. |
| 2013/0035115 | A1 | 2/2013 | Lindegren et al. |
| 2013/0310055 | A1* | 11/2013 | Dewing ............. H04W 76/025 455/450 |
| 2014/0187238 | A1 | 7/2014 | Tsuda |
| 2015/0181374 | A1 | 6/2015 | Tsuda |

* cited by examiner

[Fig. 1]
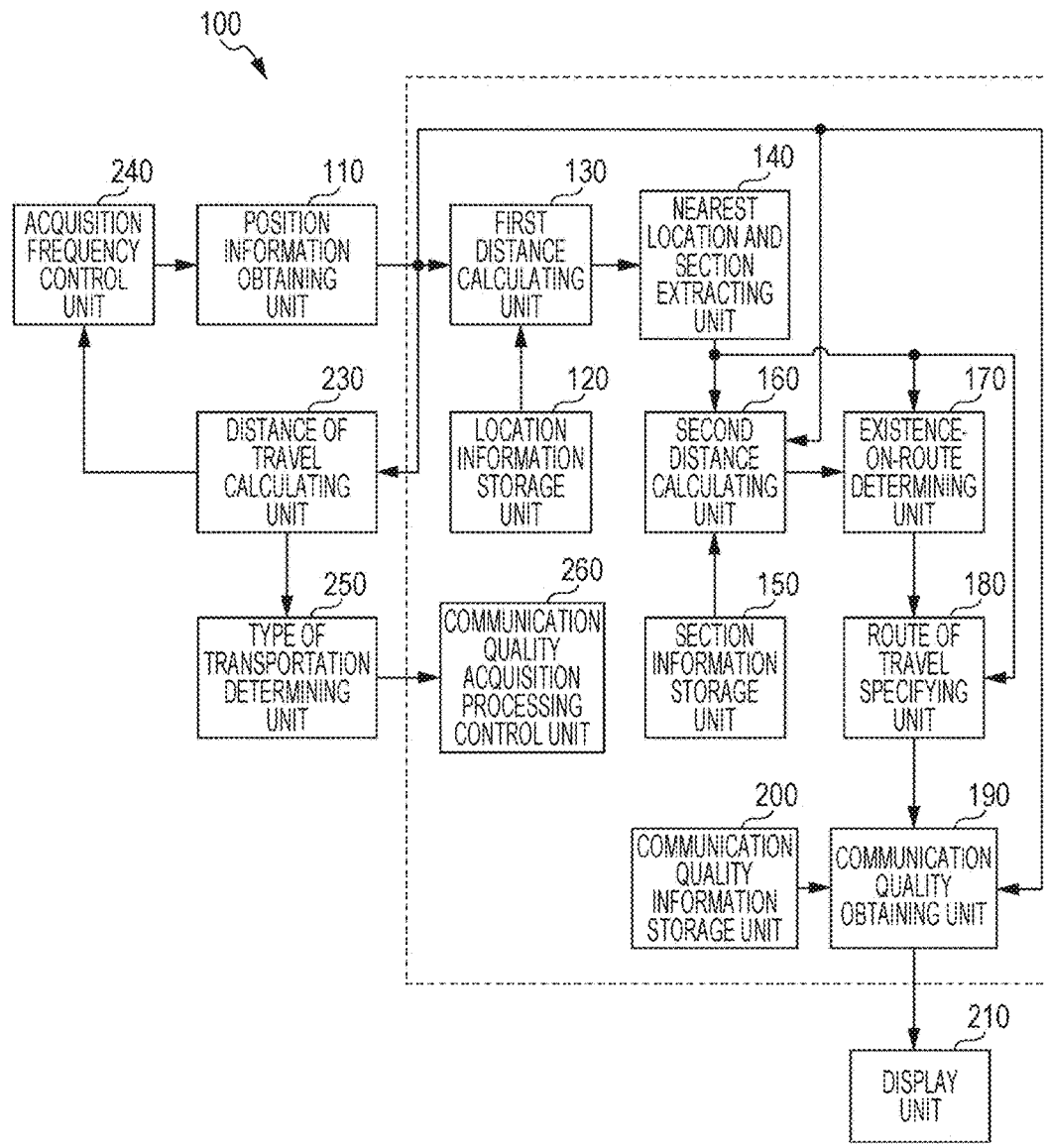

[Fig. 2]
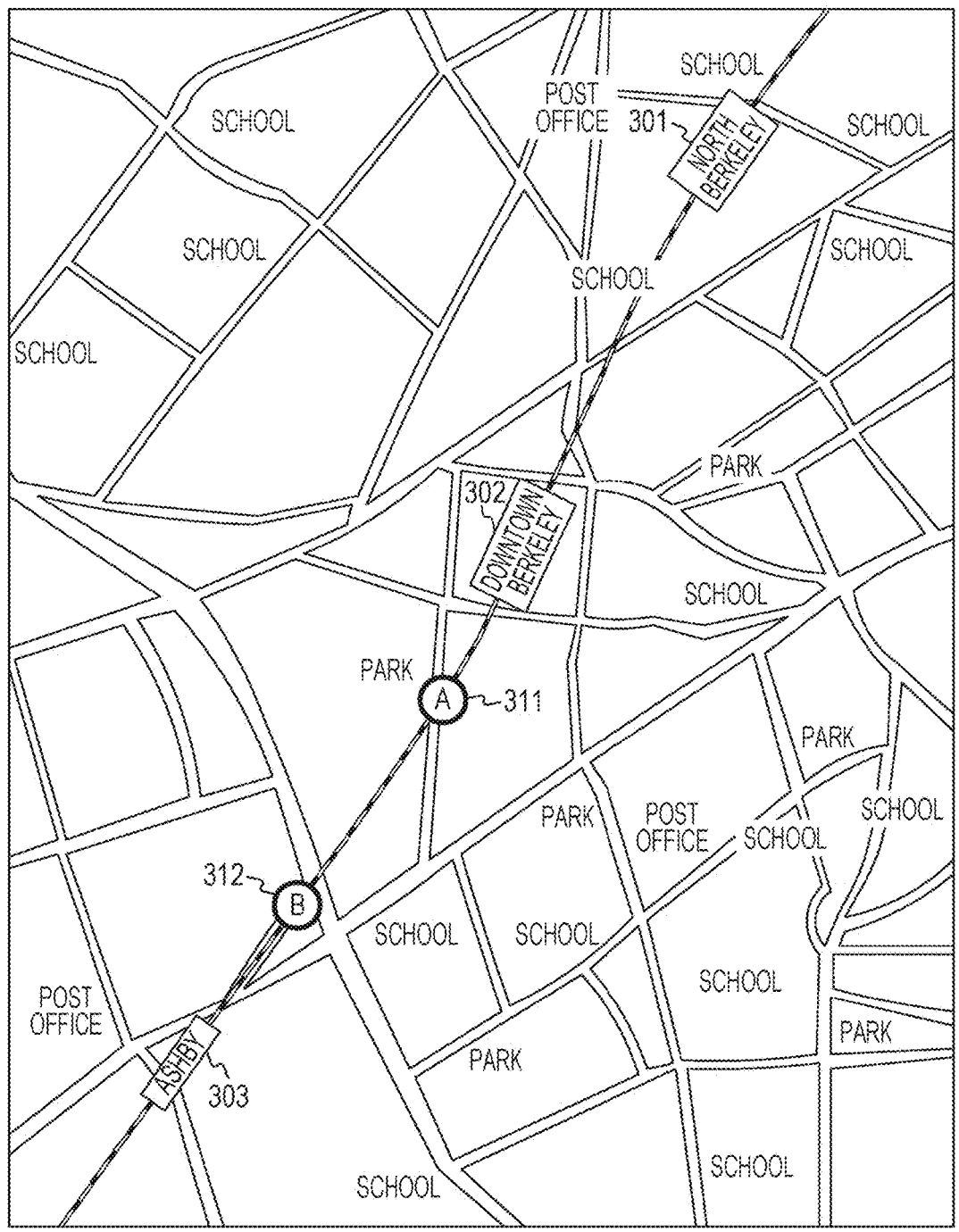

[Fig. 3]
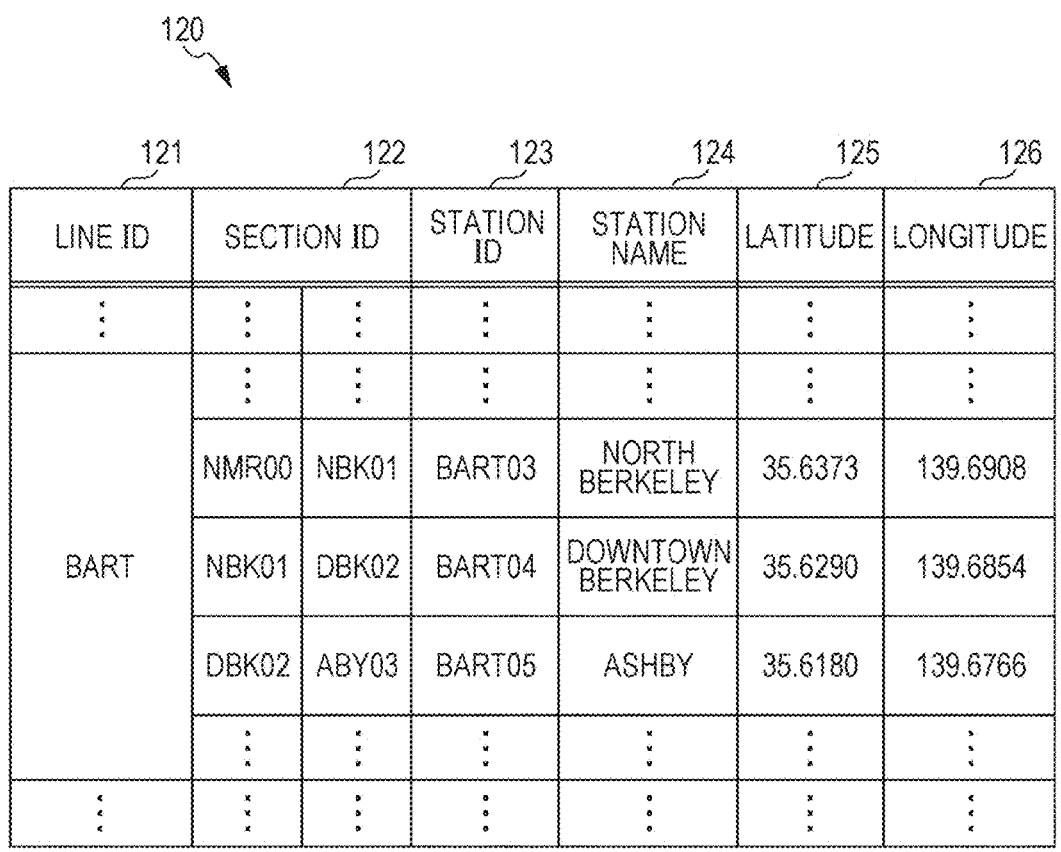

[Fig. 4]

| SECTION ID | SECTION NAME | POSITION INFORMATION | | | | | |
|---|---|---|---|---|---|---|---|
| | | LATITUDE / LONGITUDE | LATITUDE / LONGITUDE | ... | LATITUDE / LONGITUDE | ... | |
| ⋮ | ⋮ | ⋮ | ⋮ | ... | ⋮ | ... | |
| NBK01 | NORTH BERKELEY TO DOWNTOWN BERKELEY | 35.6373 | 35.6357 | ... | 35.6290 | ... | |
| | | 139.6908 | 139.6895 | | 139.6854 | | |
| DBK02 | DOWNTOWN BERKELEY TO ASHBY | 35.6290 | 35.6264 | ... | 35.6180 | ... | |
| | | 139.6854 | 139.6839 | | 139.6766 | | |
| ⋮ | ⋮ | ⋮ | ⋮ | ... | ⋮ | ... | |

[Fig. 5]

[Fig. 6]
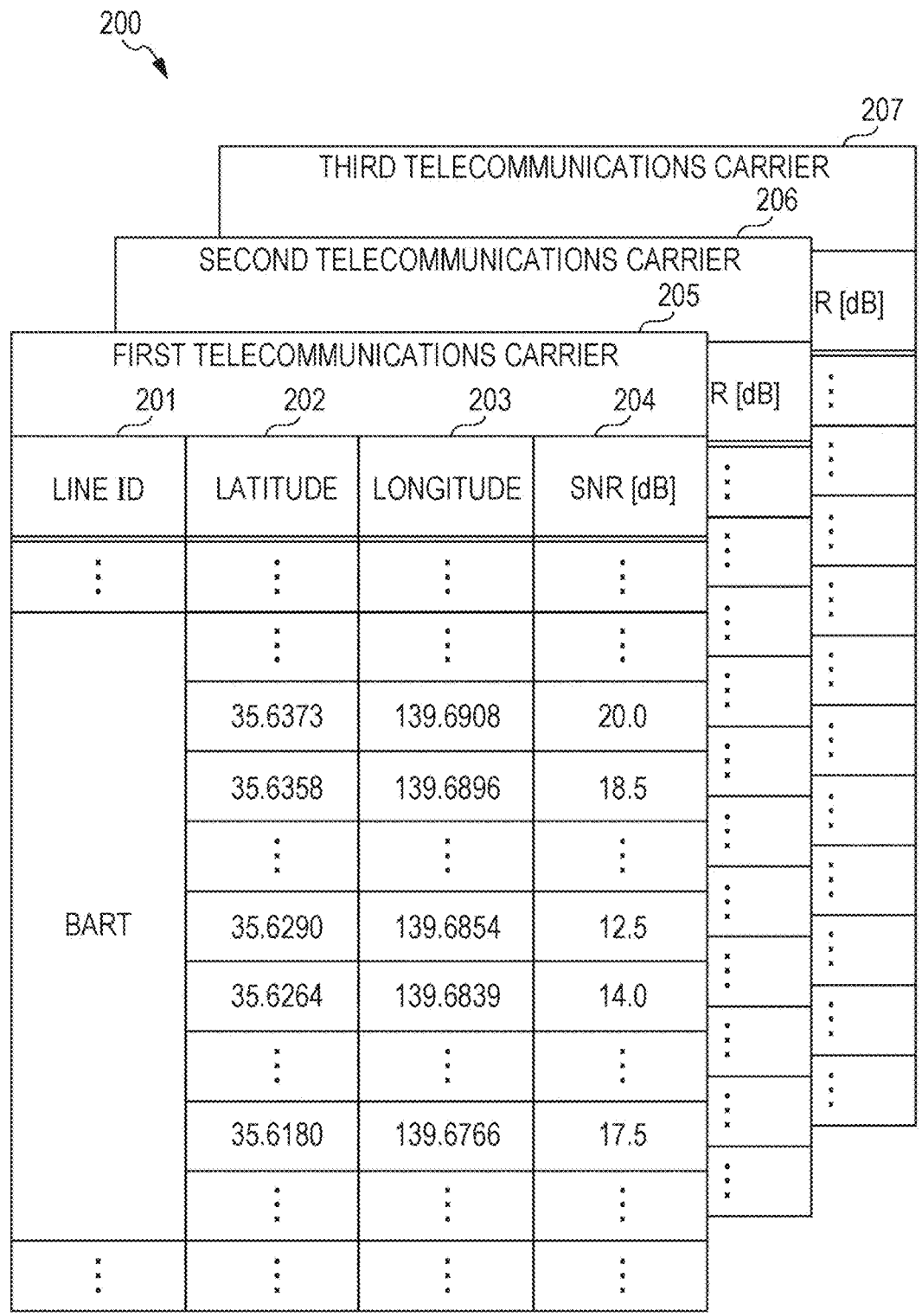

[Fig. 12]
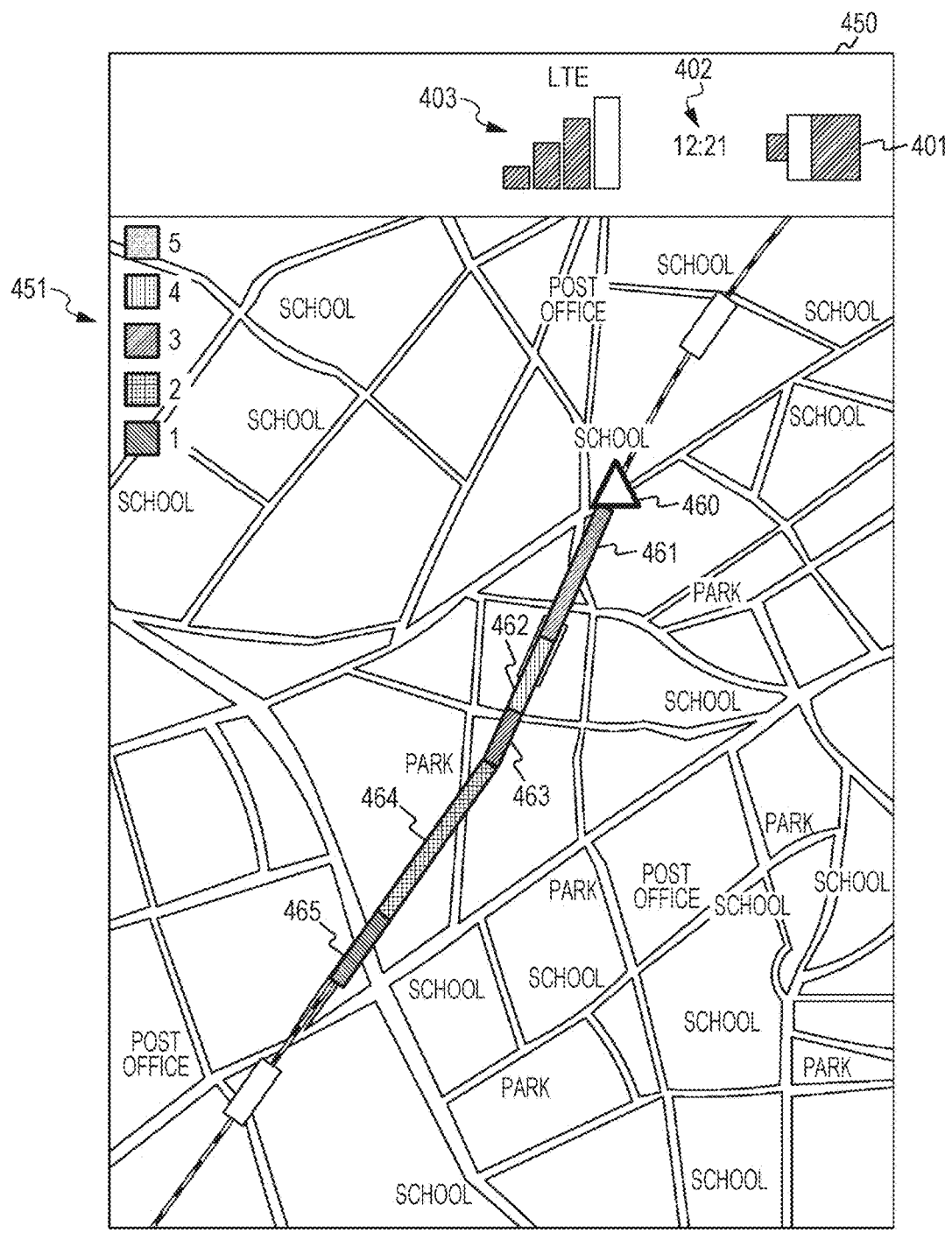

[Fig. 13]
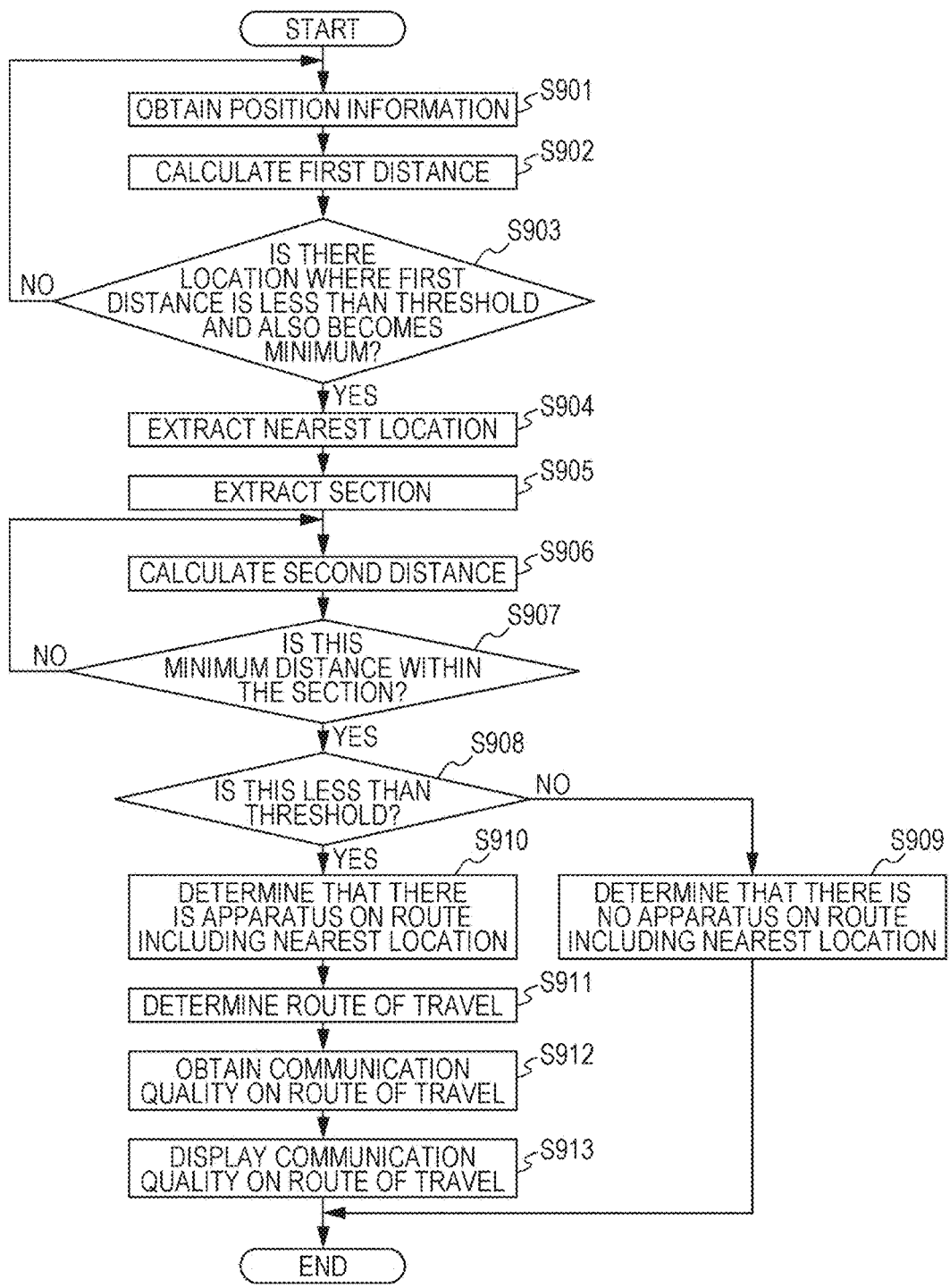

[Fig. 14]
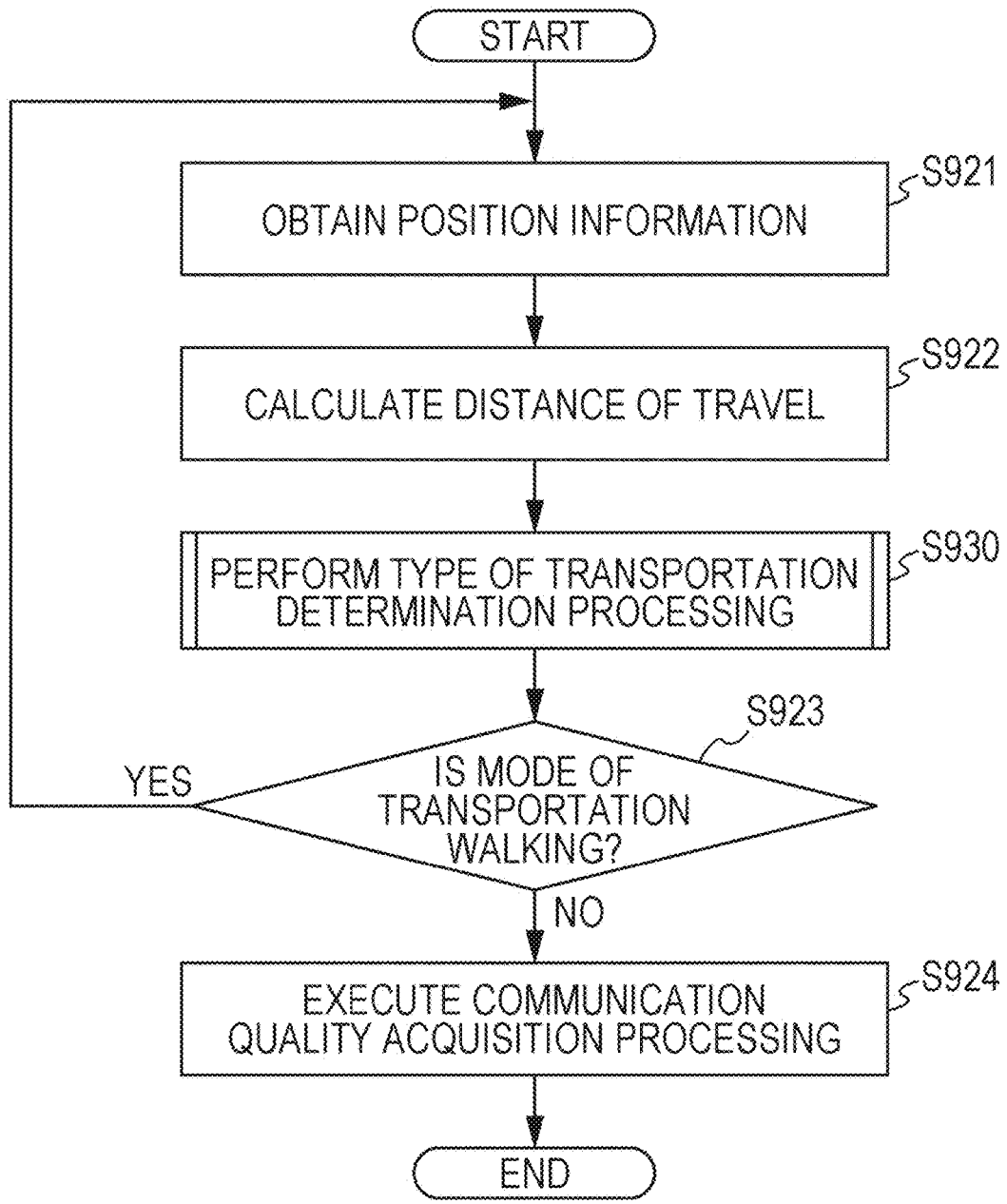

[Fig. 15]
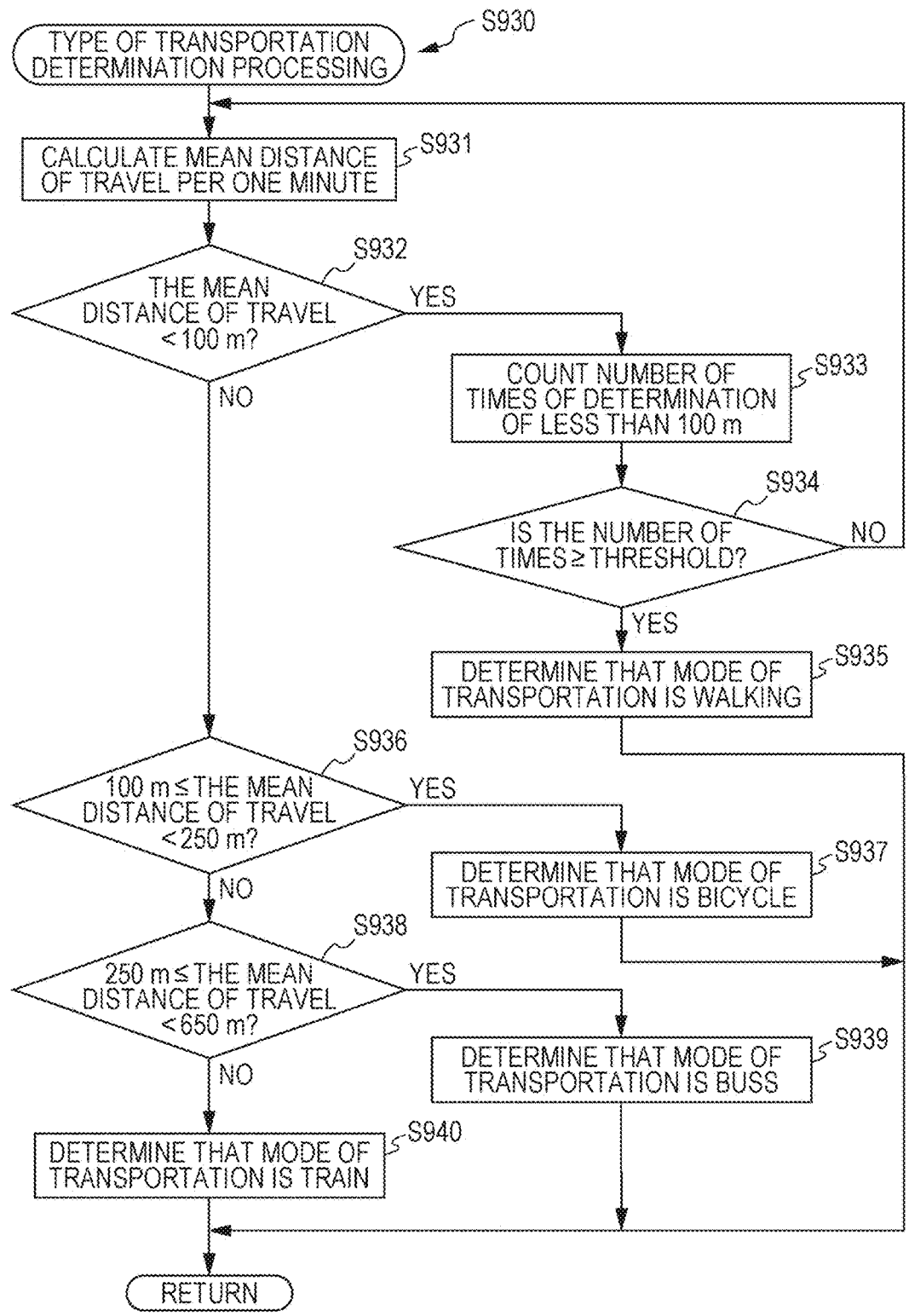

| | 35.8 139.5 | 35.8 139.6 | 35.8 139.7 | 35.8 139.8 |
|---|---|---|---|---|
| | AREA 1 | AREA 2 | AREA 3 | |
| | 35.7 139.5 | 35.7 139.6 | 35.7 139.7 | 35.7 139.8 |
| | AREA 4 | AREA 5 | AREA 6 | |
| | 35.6 139.5 | 35.6 139.6 | 35.6 139.7 | 35.6 139.8 |
| | AREA 7 | AREA 8 | AREA 9 | |
| | 35.5 139.5 | 35.5 139.6 | 35.5 139.7 | 35.5 139.8 |

| LINE ID (121) | SECTION ID (122) | STATION ID (123) | STATION NAME (124) | LATITUDE (125) | LONGITUDE (126) | AREA INFO (271) |
|---|---|---|---|---|---|---|
| ⋮ | ⋮ | ⋮ | ⋮ | ⋮ | ⋮ | ⋮ |
| | ⋮ | ⋮ | ⋮ | ⋮ | ⋮ | |
| | NMR00 | NBK01 | BART03 | NORTH BERKELEY | 35.6373 | 139.6908 | |
| BART | NBK01 | DBK02 | BART04 | DOWNTOWN BERKELEY | 35.6290 | 139.6854 | 5 |
| | DBK02 | ABY03 | BART05 | ASHBY | 35.6180 | 139.6766 | |
| | ⋮ | ⋮ | ⋮ | ⋮ | ⋮ | ⋮ | |
| ⋮ | ⋮ | ⋮ | ⋮ | ⋮ | ⋮ | ⋮ |

[Fig. 17]
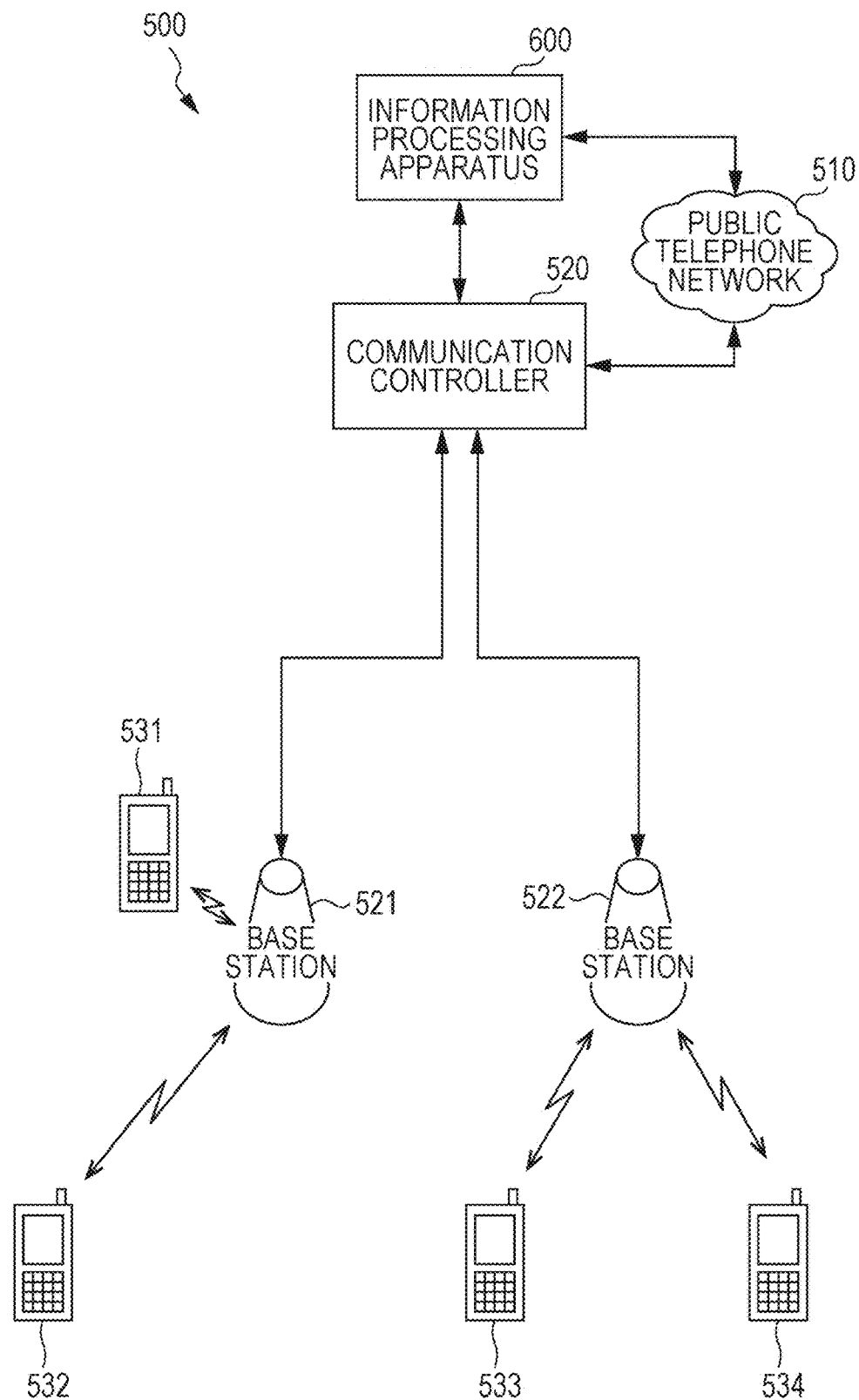

[Fig. 18]
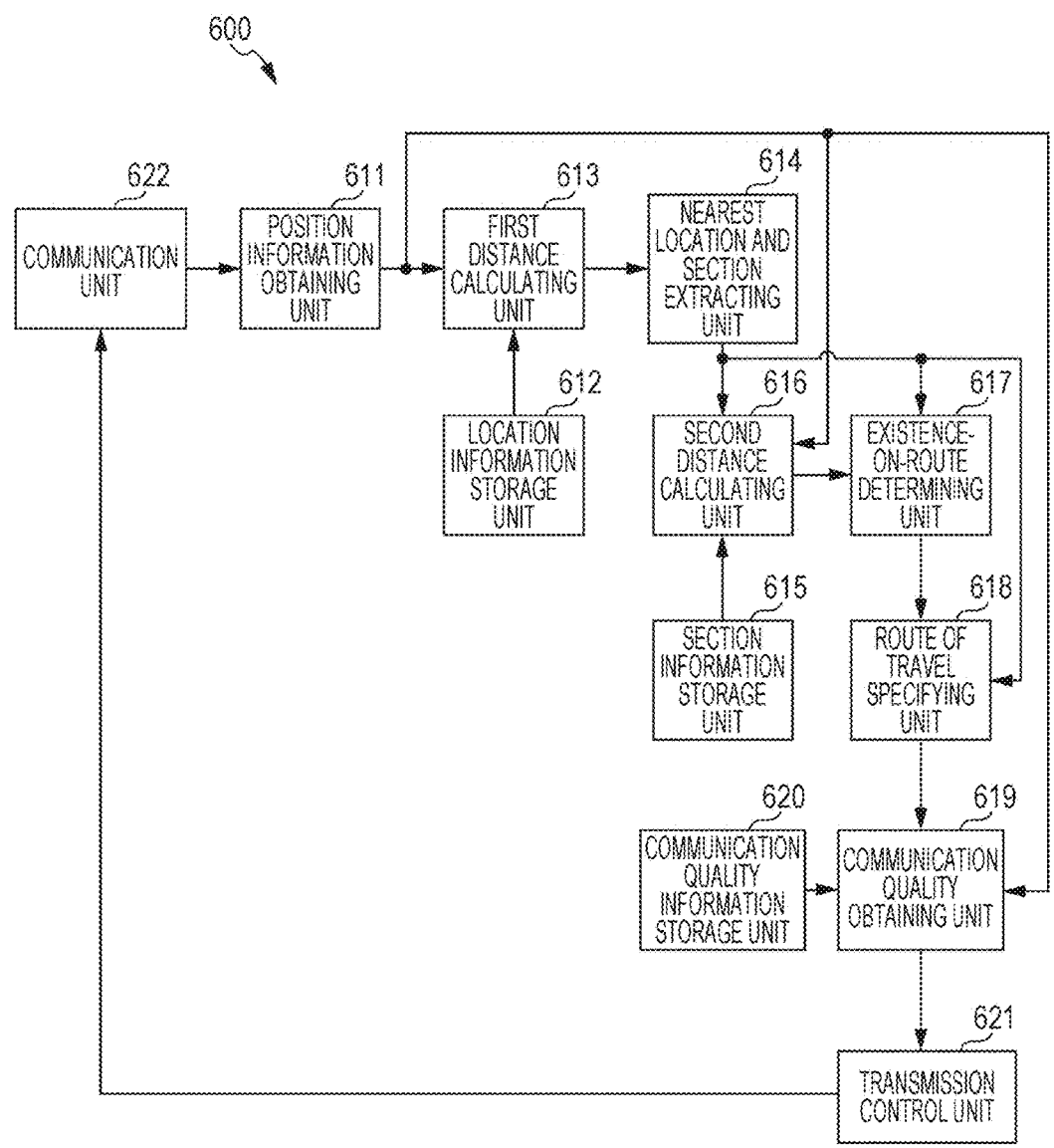

[Fig. 19]
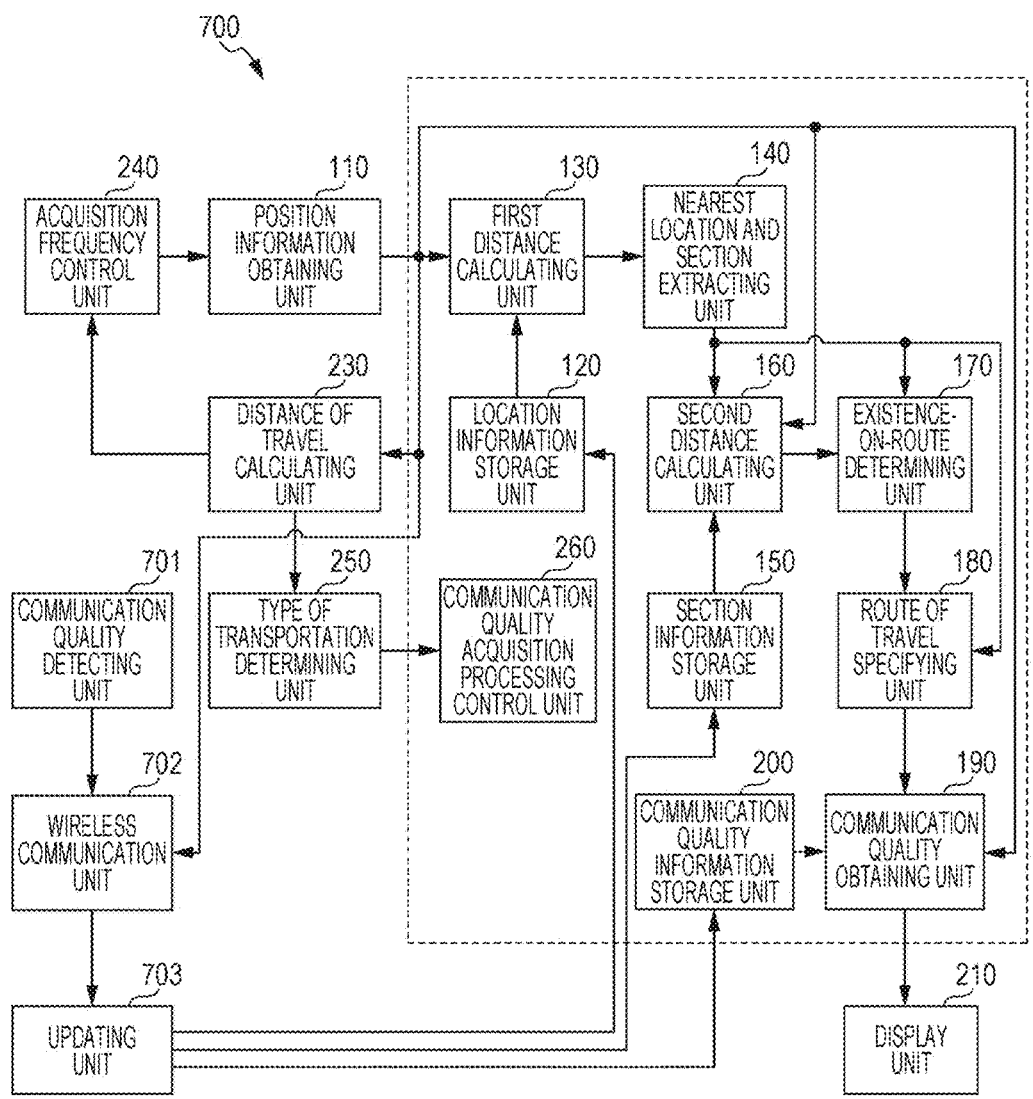

[Fig. 20]
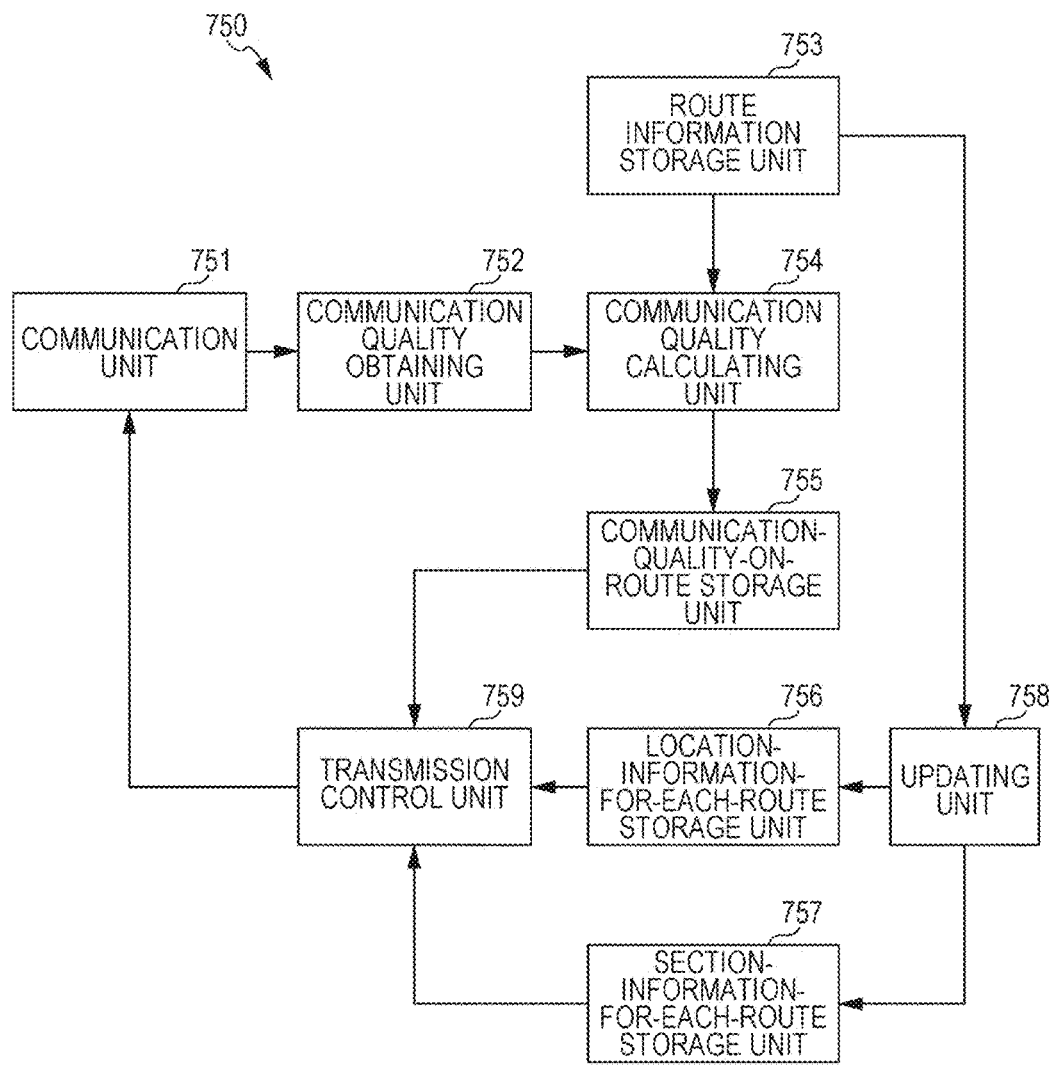

[Fig. 21]
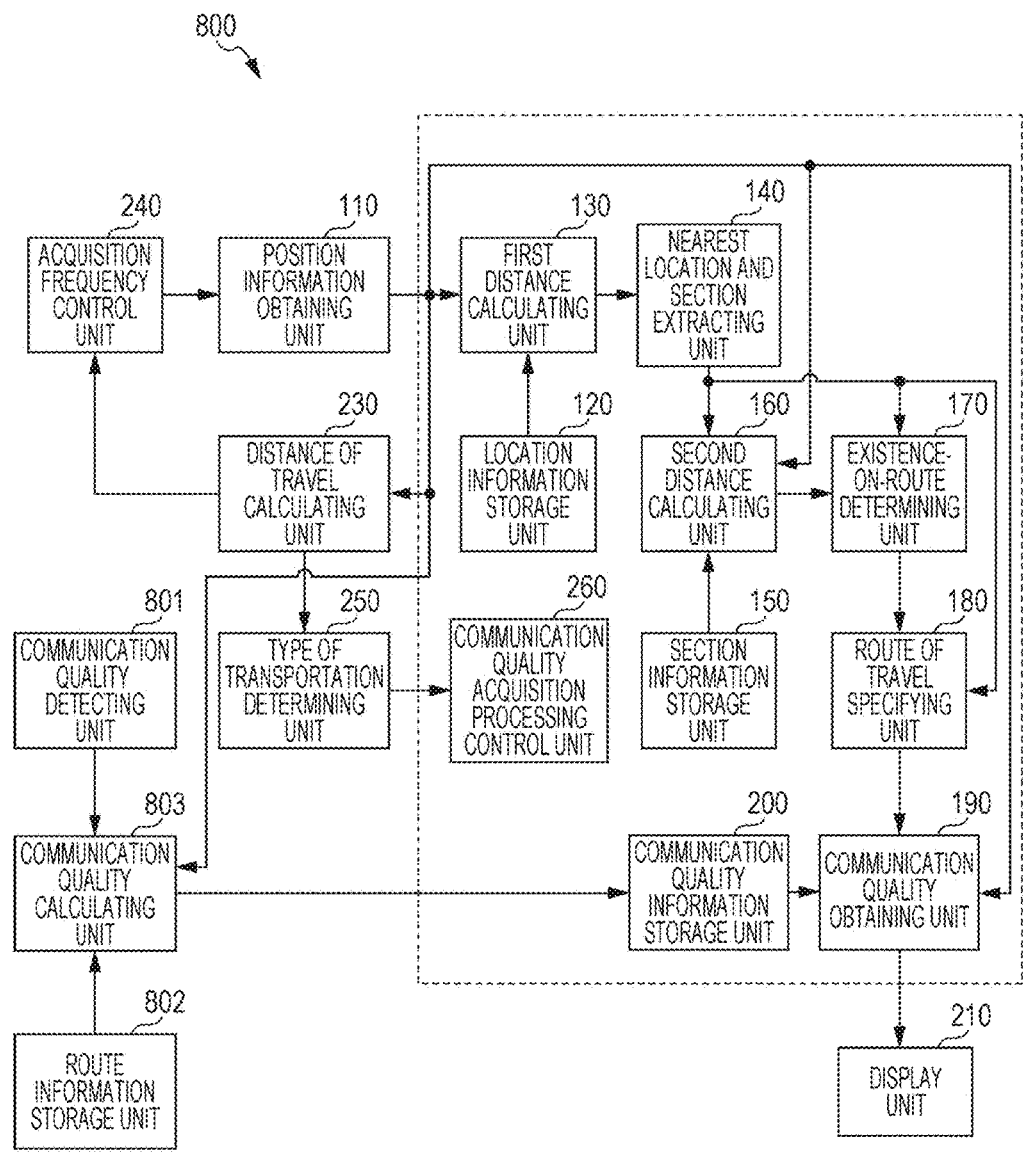

TECHNIQUES FOR OBTAINING AND DISPLAYING COMMUNICATION QUALITY INFORMATION

RELATED APPLICATIONS

This application is a continuation of and claims the benefit under 35 U.S.C. § 120 of U.S. patent application Ser. No. 14/416,290, titled "MOBILE DEVICE, METHOD AND RECORDING MEDIUM," filed on Jan. 22, 2015, which is a U.S. National Stage Application under 35 U.S.C. § 371, based on International Application No. PCT/JP2013/004517, filed Jul. 24, 2013, which claims priority under 35 U.S.C. § 119(a) to Japanese Application Ser. No. 2012-169475, filed on Jul. 31, 2012. The entire contents of these applications are hereby incorporated by reference in their entireties.

TECHNICAL FIELD

The present disclosure relates to an information processing apparatus, and specifically relates to an information processing apparatus, a communication system, and an information processing method which perform processing relating to wireless communication, and a program causing a computer to execute this method.

BACKGROUND ART

Heretofore, wireless communication apparatuses configured to connect to networks such as a public wireless network or the like have widely been spread. Also, the 3G (3rd Generation) mobile phone service (also referred to as third generation in Japan) has been started since 2002. With this mobile phone service, small capacity packets such as audio, email, and so forth have been a major application. However, due to introduction of HSDPA (High Speed Downlink Packet Access) and so forth, users have come more to download relatively large sized packets, such as downloading music files or viewing a moving images, or the like.

Also, for example, it will also be assumed that users are concentrated in a particular area and perform download of large capacity packets. In this case, traffic is locally concentrated, and accordingly, there is concern that a sufficient rate may not be obtained.

Therefore, for example, there has been proposed an information providing apparatus which obtains communication parameters correlated with position information, and provides image information in which the communication parameters are inscribed on map information to a user (see PTL 1).

CITATION LIST

Patent Literature

[PTL 1]
JP 2012-109742A

SUMMARY

Technical Problem

According to the above-mentioned related art, a user is allowed to recognize communication quality in an area where a wireless communication apparatus exists.

Now, for example, a case is assumed where a user who holds a wireless communication apparatus is on a train. In this case, the wireless communication apparatus moves along with the train, and accordingly, the area where the wireless communication apparatus exists continuously changes. In such a case, it is important for the user to readily recognize communication quality of a destination of travel of the wireless communication apparatus.

It has been found to be desirable to readily recognize communication quality of a destination of travel of a wireless communication apparatus.

Solution to Problem

Accordingly, some embodiments are directed to a mobile device, comprising at least one processor configured to perform: obtaining position information for at least first and second positions of the mobile device along a route; obtaining communication quality information for at least a third position of the mobile device, the communication quality information calculated based on the route and the obtained position information; and causing the mobile device to display the obtained communication quality information.

Other embodiments are directed to a method comprising: using at least one processor to perform obtaining position information for at least first and second positions of the mobile device along a route; obtaining communication quality information for at least a third position of the mobile device, the communication quality information calculated based on the route and the obtained position information; and causing the mobile device to display the obtained communication quality information.

Still other embodiments are directed to at least one recording medium storing a program that, when executed by at least one computer, causes the at least one computer to perform: obtaining position information for at least first and second positions of the mobile device along a route; obtaining communication quality information for at least a third position of the mobile device, the communication quality information calculated based on the route and the obtained position information; and causing the mobile device to display the obtained communication quality information.

An information processing apparatus according to an embodiment of the present disclosure is an information processing apparatus including: a specifying unit configured to specify, based on a position where a wireless communication apparatus exists, a route of travel of the wireless communication apparatus; and an output control unit configured to output communication quality of wireless communication on the route of travel from the wireless communication apparatus, and an information processing method thereof and a program causing a computer to execute this method. Thus, there is provided an advantage wherein communication quality of wireless communication on a route of travel of the wireless communication apparatus is output from the wireless communication apparatus.

Also, the specifying unit may specify, of routes extracted based on a position where the wireless communication apparatus exists of multiple routes, a route headed to a direction of travel of the wireless communication apparatus from a position where the wireless communication apparatus exists as the route of travel; with the output control unit obtaining and outputting the communication quality in each position to be situated with a predetermined interval on the route of travel. Thus, there is provided an advantage wherein of routes extracted based on a position where the wireless communication apparatus exists of multiple routes, a route headed to a direction of travel of the wireless communication apparatus from the position where the wireless communication apparatus exists is determined as a route of travel, and communication quality in each position situated with a predetermined interval on the route of travel is obtained and output.

Also, the information processing apparatus may further include: a position information obtaining unit configured to obtain position information for specifying a position where the wireless communication apparatus exists; a location information storage unit configured to store location information including position information for specifying each location to be situated in one or a plurality of routes; a first distance calculating unit configured to calculate, for each position situated on the route, first distance which is distance between a position where the wireless communication apparatus exists and a location situated on the route, based on the obtained position information, and position information included in the location information; and an extracting unit configured to extract a location regarding which the first distance is the shortest, of locations situated on the route, as the nearest location; with the specifying unit specifying the route including the extracted nearest location as the route of travel. Thus, there is provided an advantage wherein the first distance is calculated based on the obtained position information and position information included in the location information, a location where the first distance is the shortest is extracted out of locations situated on the route as the nearest location, and the route including the extracted nearest location is determined as the route of travel.

Also, the information processing apparatus may further include: a section information storage unit configured to store section information in which a section of two adjacent locations on the route, and position information for specifying each position in this section are correlated; a second distance calculating unit configured to calculate, based on the obtained position information, and position information according to each position in a section including the extracted nearest location, second distance which is distance between a position where the wireless communication apparatus exists and a position in this section for each position in this section; and a determining unit configured to determine whether or not the wireless communication apparatus exists on the route including the extracted nearest location based on the calculated second distance; with the specifying unit specifying a route where the wireless communication apparatus has been determined to exist, as the route of travel. Thus, there is provided an advantage wherein the second distance is calculated based on the obtained position information, and position information according to each position in a section including the extracted nearest location, determination is made based on this calculated second distance whether or not the wireless communication apparatus exists on the route including the extracted nearest location, and the route where the wireless communication apparatus has been determined to exist is specified as the route of travel.

Also, the extracting unit may extract the multiple different nearest locations based on a plurality of position information obtained at different time of the obtained position information, and position information included in the location information; with the specifying unit specifying a direction of travel of the wireless communication apparatus on a route where the wireless communication apparatus has been determined to exist based on the multiple extracted different nearest locations, and specifying a route headed to the specified direction of travel from a position where the wireless communication apparatus exists of the route where the wireless communication apparatus has been determined to exist, as the route of travel. Thus, there is provided an advantage wherein, based on a plurality of position information obtained at different time of the obtained position information, and position information included the location information, multiple different nearest locations are extracted, a direction of travel of the wireless communication apparatus on a route where the wireless communication apparatus has been determined to exist is specified based on the multiple nearest locations, and a route directed in the specified direction of travel from the position where the wireless communication apparatus exists of the route where the wireless communication apparatus has been determined to exist is specified as the route of travel.

Also, the determining unit may determine, in the event that at least one of the calculated second distances is shorter than a threshold, that the wireless communication apparatus exists on the route including the extracted nearest location. Thus, there is provided an advantage wherein, in the event that at least one of the second distances is smaller than a threshold, determination is made that the wireless communication apparatus exists on the route including the extracted nearest location.

Also, the information processing apparatus may further include: a communication quality information storage unit configured to store communication quality information in which each position on the route is correlated with the communication quality; with the output control unit obtaining the communication quality on the route of travel from the communication quality information according to a route where the wireless communication apparatus has been determined to exist, and outputting this to the wireless communication apparatus. Thus, there is provided an advantage wherein communication quality according to the route of travel is obtained from the communication quality information according to a route where the wireless communication apparatus has been determined to exist, and output to the wireless communication apparatus.

Also, the information processing apparatus may further include: a distance of travel calculating unit configured to calculate distance of travel of the wireless communication apparatus based on a plurality of position information obtained at different time of the obtained position information; and an acquisition frequency control unit configured to control acquisition frequency of position information obtained by the position information obtaining unit based on the calculated distance of travel. Thus, there is provided an advantage wherein distance of travel of the wireless communication apparatus is calculated based on a plurality of position information obtained at different time of the obtained position information, and acquisition frequency of position information by the position information obtaining unit is controlled based on this calculated distance of travel.

Also, the information processing apparatus may further include: a distance of travel calculating unit configured to calculate distance of travel of the wireless communication apparatus based on a plurality of position information obtained at different time of the obtained position information; a type of travel determining unit configured to determine type of a mode of transportation of the wireless communication apparatus based on the calculated distance of travel; and an acquisition frequency control unit configured to control acquisition frequency of communication quality output by the output control unit, based on a determination result determined by the type of travel determining unit. Thus, there is provided an advantage wherein a distance of travel of the wireless communication apparatus is calculated based on a plurality of position information obtained at different time of the obtained position information, the type of a mode of transportation of the wireless communication apparatus is determined based on this calculated distance of travel, and acquisition frequency of communication quality by the output control unit is controlled based on this determination result.

Also, the information processing apparatus may be the wireless communication apparatus; with the output control unit displaying the communication quality on a display unit of the wireless communication apparatus. Thus, there is provided an advantage wherein communication quality is displayed on the display unit of the wireless communication apparatus.

Also, the route may be a railroad; with the location being a station. Thus, there is provided an advantage wherein a railroad is specified as a route of travel of the wireless communication apparatus.

Also, the route may be a road; with the location being at least one of an intersection, a part or all of an address, a store, a building structure, a bus stop, a historic site, a beauty spot, a park, a river, and a harbor. Thus, there is provided an advantage wherein a road is specified as a route of travel of the wireless communication apparatus.

A communication system according to an embodiment of the present disclosure is a communication system including: an information processing apparatus including a location information storage unit configured to store location information including position information for specifying each location to be situated in one or a plurality of routes, a section information storage unit configured to store section information in which a section of two adjacent locations on the route, and position information for specifying each location in this section are correlated, a communication quality information storage unit configured to store communication quality information in which each position on the route is correlated with communication quality of wireless communication in this position, and a transmission control unit configured to transmit the location information, the section information, and the communication quality information to a wireless communication apparatus; and a wireless communication apparatus including a position information obtaining unit configured to obtain position information for specifying a position where the wireless communication apparatus exists, a specifying unit configured to specify a route of travel of the wireless communication apparatus based on the location information and the section information transmitted from the information processing apparatus, and the obtained position information, and an output control unit configured to obtain the communication quality on the route of travel from the communication quality information transmitted from the information processing apparatus and to display this on a display unit, and an information processing method thereof and a program causing a computer to execute this method. Thus, there is provided an advantage wherein the information processing device transmits location information and section information and communication quality information to the wireless communication apparatus, a route of travel of the wireless communication apparatus is specified based on location information and section information transmitted from the information processing apparatus, and the obtained position information, communication quality in this route of travel is obtained from communication quality information transmitted from the information processing apparatus, and displayed on the display unit.

Also, the wireless communication apparatus may further include a communication quality detecting unit configured to detect the communication quality in a position where the wireless communication apparatus exists, and a transmission control unit configured to transmit communication quality information in which the obtained position information and the detected communication quality are correlated to the information processing apparatus; with the information processing apparatus further including an updating unit configured to perform updating of communication quality information stored in the communication quality information storage unit using communication quality information transmitted from the wireless communication apparatus. Thus, there is provided an advantage wherein the wireless communication apparatus transmits communication quality information in which the obtained position information and the detected communication quality are correlated, to the information processing apparatus, and the information processing apparatus performs updating of communication quality information stored in the communication quality information storage unit using communication quality information transmitted from the wireless communication apparatus.

Advantageous Effects of Invention

According to the present technology, an excellent advantage may be yielded wherein communication quality of a destination of travel of a wireless communication apparatus may readily be recognized.

BRIEF DESCRIPTION OF DRAWINGS

FIG. 1 is a block diagram illustrating a functional configuration example of a wireless communication apparatus according to a first embodiment of the present technology.

FIG. 2 is a diagram illustrating a map including a part of the locations where each information is stored in a location information storage unit according to the first embodiment of the present technology.

FIG. 3 is a diagram schematically illustrating an example of storage contents of the location information storage unit according to the first embodiment of the present technology.

FIG. 4 is a diagram schematically illustrating an example of storage contents of a section information storage unit according to the first embodiment of the present technology.

FIG. 6 is a diagram schematically illustrating an example of storage contents of a communication quality information storage unit according to the first embodiment of the present technology.

FIG. 12 is a diagram illustrating an example (display screen) of a display screen to be displayed on the display unit according to the first embodiment of the present technology.

FIG. 13 is a flowchart illustrating an example of processing procedure of communication-quality-on-route display processing of the wireless communication apparatus according to the first embodiment of the present technology.

FIG. 14 is a flowchart illustrating an example of processing procedure of communication quality acquisition processing control processing of the wireless communication apparatus according to the first embodiment of the present technology.

FIG. 15 is a flowchart illustrating an example of type of travel determination processing procedure of the communication quality acquisition processing control processing of the wireless communication apparatus according to the first embodiment of the present technology.

FIG. 16A is a diagram illustrating an example of the areas in the event of managing location information to be stored in a location information storage unit according to the first embodiment of the present technology in increments of areas. FIG. 16B is a diagram illustrating an example of storage contents of the location information storage unit according to the first embodiment of the present technology.

FIG. 17 is a block diagram illustrating a functional configuration example of a communication system according to a second embodiment of the present technology.

FIG. 18 is a block diagram illustrating a functional configuration example of an information processing apparatus according to the second embodiment of the present technology.

FIG. 19 is a block diagram illustrating a functional configuration example of a wireless communication apparatus according to a third embodiment of the present technology.

FIG. 20 is a block diagram illustrating a functional configuration example of an information processing apparatus according to the third embodiment of the present technology.

FIG. 21 is a block diagram illustrating a functional configuration example of a wireless communication apparatus according to a fourth embodiment of the present technology.

DESCRIPTION OF EMBODIMENTS

Figure 5A:
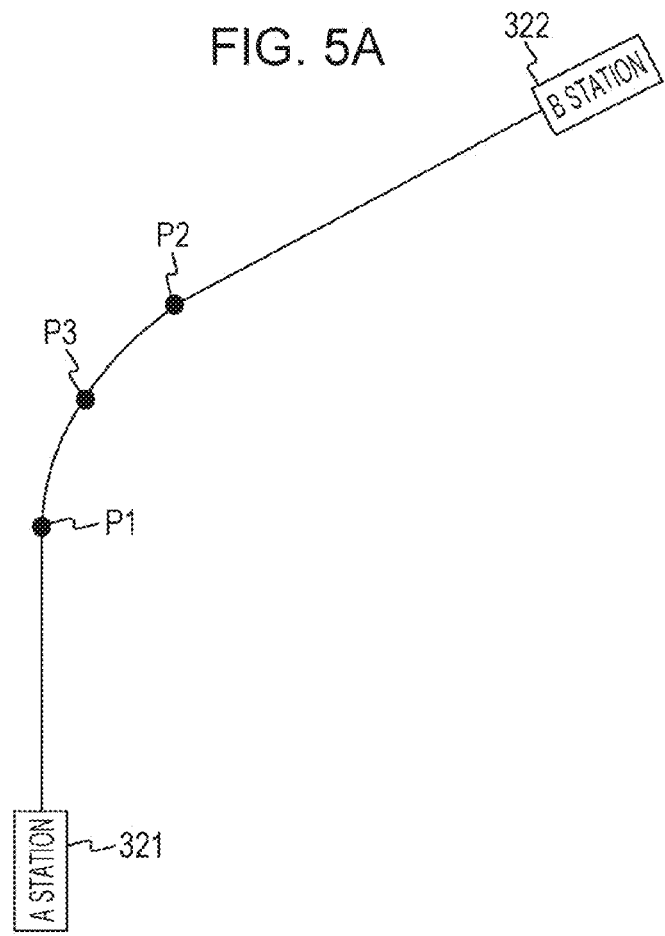
FIGS. 5A and 5B are diagrams schematically illustrating an example of a method for setting position information stored in the section information storage unit according to the first embodiment of the present technology.

Hereinafter, modes for implementing the present technology (hereinafter, referred to as embodiments) will be described. Description will be made in accordance with the following sequence.

1. First embodiment (communication quality display control: an example wherein a route of travel is specified in a wireless communication apparatus, and communication quality on the route of travel thereof is displayed)
2. Second embodiment (communication quality display control: an example wherein a route of travel of a wireless communication apparatus is specified in an information processing apparatus, and communication quality on the route of travel thereof is displayed on the wireless communication apparatus thereof)
3. Third embodiment (communication quality information updating control: an example wherein a wireless communication apparatus and an information processing apparatus collaborate to update location information, section information, and communication quality information)
4. Fourth embodiment (communication quality information storage control: an example wherein communication quality information is obtained by a wireless communication apparatus and stored)

1. First Embodiment

"Configuration Example of Wireless Communication Apparatus"

FIG. 1 is a block diagram illustrating a functional configuration example of a wireless communication apparatus 100 according to a first embodiment of the present technology.

The wireless communication apparatus 100 includes a position information obtaining circuit 110, a location information storage unit 120, a first distance calculating unit 130, a nearest location and section extracting unit 140, a section information storage unit 150, a second distance calculating unit 160, and an existence-on-route determining unit 170. Also, the wireless communication apparatus 100 includes a route of travel specifying unit 180, a communication quality obtaining unit 190, a communication quality information storage unit 200, a display unit 210, a distance of travel calculating unit 230, an acquisition frequency control unit 240, a type of travel determining unit 250, and a communication quality acquisition processing control unit 260. Note that examples of the wireless communication apparatus 100 include a mobile phone apparatus (e.g., a mobile phone apparatus or smart phone having a communication function and a data communication function), and a data communication apparatus (e.g., a personal computer) having a wireless communication function. Also, the wireless communication apparatus 100 is an example of the wireless communication apparatus and information processing apparatus.

The position information obtaining unit 110 is configured to obtain information (position information (e.g., latitude, longitude, altitude)) for specifying a position where the wireless communication apparatus 100 exists (position within wireless range) at a fixed or variable cycle. The position information obtaining unit 110 outputs the obtained position information to the first distance calculating unit 130, second distance calculating unit 160, communication quality obtaining unit 190, and distance of travel calculating unit 230. The position information obtaining unit 110 is realized by a GPS receiver configured to receive GPS (Global Positioning System) signals and to calculate latitude, longitude, and altitude, for example. Also, the position information obtaining unit 110 may be configured to obtain position information from an information processing apparatus (e.g., a communication controller operated by a telecommunications carrier according to contract authentication information currently set). For example, the position information obtaining unit 110 may obtain information (position information) relating to a position corresponding to identification information of a base station of a wireless communication apparatus (e.g., mobile phone) or can access point of a wireless LAN (Local Area Network) from another information processing apparatus. Note that an example of the identification information of a base station of a wireless communication apparatus is cell ID, and an example of the identification information of an access point of a wireless LAN is SSID (Service Set Identifier).

Also, contract authentication information is information used for connection to a wireless communication network managed by a telecommunications carrier, and includes, for example, subscriber information relating to authentication and accounting, and so forth. Also, contract authentication information includes, for example, phone subscriber information, and authentication key (authentication) information. An example of contract authentication information is USIM (Universal Subscriber Identify Module).

The location information storage unit 120 is configured to store information (location information) for specifying each location (e.g., station) to be situated in a predetermined signal or multiple routes (e.g., railroad), and to supply stored location information to the first distance calculating unit 130. Note that location information to be stored in the location information storage unit 120 will be described in detail with reference to FIGS. 2 and 3.

The section information storage unit 150 is configured to store information (section information) in which a section of two adjacent locations on a route, and position information for specifying each position in this section are correlated, and to supply stored section information to the second distance calculating unit 160. Note that section information to be stored in the section information storage unit 150 will be described in detail later with reference to FIGS. 2 and 4.

The communication quality information storage unit 200 is configured to store information (communication quality information) in which each position on a route and communication quality in each position are correlated, and to supply stored communication quality information to the communication quality obtaining unit 190. Note that communication quality information to be stored in the communication quality information storage unit 200 will be described in detail later with reference to FIGS. 2 and 6.

"Example of Map"

FIG. 2 is a diagram illustrating a map including a portion of the points where each information is stored in the location information storage unit 120 according to the first embodiment of the present technology.

The map illustrated in FIG. 2 is a map including a part of Bay Area Rapid Transit (hereinafter, also referred to as BART), and specifically a map including the stations (North Berkeley 301, Downtown Berkeley 302, and Ashby 303) of BART and a periphery thereof. Note that, in FIG. 2, detailed portions are omitted. Also, white circles (location A 311, and location B 312) will be described in detail with reference to FIG. 1.

"Storage Contents Example of Location Information Storage Unit"

FIG. 3 is a diagram schematically illustrating an example of storage contents of the location information storage unit 120 according to the first embodiment of the present technology.

With the location information storage unit 120, line ID 121, section ID 122, station ID 123, station name 124, latitude 125, and longitude 126 are stored in a correlated manner.

The line ID 121 is identification information for identifying a line. For example, "BART" is stored in the line ID 121 as the line ID of BART.

The section ID 122 is identification information for identifying a section between two stations, a single or multiple section IDs are stored regarding one station. For example, "NBK01" is stored in the section ID 122 as a section ID between North Berkeley and Downtown Berkeley in BART.

The station ID 123 is identification information for identifying a station. For example, "BART03" is stored in the station ID 123 as a station ID of North Berkeley in BART.

The station name 124 is the name of a station.

The latitude 125 is latitude for specifying a position where a station exists, and the longitude 126 is longitude for specifying a position where a station exists.

Note that FIG. 3 illustrates, for ease of description, only each information corresponding to three stations of "North Berkeley", "Downtown Berkeley", and "Ashby" exist on the map illustrated in FIG. 2.

Note that, with embodiments of the present technology, description will be made regarding an example wherein a train line is taken as a predetermined route, and locations situated on the route thereof are taken as stations of North Berkeley, Downtown Berkeley, Ashby, and so forth. However, the routes and locations are not restricted to these, and may be applied to optional locations. For example, an arrangement may be made wherein a road (e.g., highway, bus road) is taken as a predetermined route, and locations to be situated on the route thereof are taken as intersections, a part or all of an address (e.g., XXX Street YYY City), stores, building structures, bus stops, historic sites, beauty spots, parks, rivers, harbors, and so forth. Also, at least one of these may be taken as a location to be situated on the route thereof. Also, for example, an arrangement may be made wherein a river (e.g., a route of a liner) is taken as a predetermined route, and a landing place of a liner, or the like, is taken as a location to be situated on the route thereof.

"Storage Contents Example of Section Information Storage Unit"

FIG. 4 is a diagram schematically illustrating an example of storage contents of the section information storage unit 150 according to the first embodiment of the present technology.

Section ID 151, section name 152, and position information 153 are stored in the section information storage unit 150 in a correlated manner.

The section ID 151 is identification information for identifying a section between two stations. Note that the section ID 151 corresponds to the section ID 122 illustrated in FIG. 3.

The section name 152 is a name that represents a section between stations.

The position information 153 is information for specifying a section between stations, in which a single or multiple position information (latitude and longitude) for specifying a position on the routed between stations are stored. Note that a method for setting position information to be stored in the position information 153 will be described in detail with reference to FIGS. 5A and 5B.

Note that FIG. 4 illustrates, for ease of description, only each information corresponding to three stations ("North Berkeley", "Downtown Berkeley", "Ashby") exist on the map illustrated in FIG. 2.

In this manner, with embodiments of the present technology, between adjacent two stations of North Berkeley and Downtown Berkeley is taken as one section, and between adjacent two stations of Downtown Berkeley and Ashby is taken as another section. Information (section information) regarding latitude and longitude of a single or multiple positions included in each section is stored in the section information storage unit 150. That is to say, section information with between adjacent locations as one section is stored in the section information storage unit 150 regarding all locations (e.g., all stations in BART) included in one route (e.g., BART).

"Setting Example of Position Information"

Figure 5B:
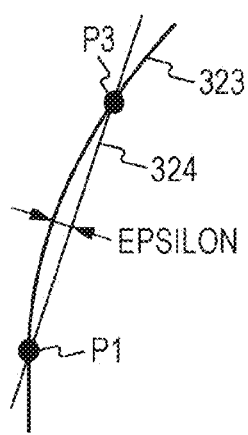

FIGS. 5A and 5B are diagrams schematically illustrating an example of a method for setting position information to be stored in the section information storage unit 150 according to the first embodiment of the present technology.

FIG. 5A illustrates a section between A station 321 and B station 322. FIG. 5B illustrates a part of a route between the A station 321 and B station 322, and a primary approximate line.

As illustrated in FIG. 5A, a section between the A station 321 and P1, and a section between P2 and the B station 322 are straight lines (or generally straight lines), but a section between the P1 and P2 is a curve.

Here, with regard to sections which are straight lines (section between the A station 321 and P1, section between the P2 and B station 322), for example, even if there are no multiple position information within a section, at the time of modeling of a route, the primary approximation may be performed. Therefore, with regard to sections which are straight lines, only position information of edge portions thereof (A station 321 and P1, P2 and B station 322) may be taken as an object to be stored in the section information storage unit 150.

On the other hand, with regard to a section which is a curve (section between the P1 and P2), for example, in the event of modeling by a primary approximate expression, position information of multiple locations has to be used.

FIG. 5B illustrates a route 323 between the A station 321 and B station 322, and a primary approximate line 324 of the P1 and P3. Also, the maximum value of error of the route 323 between the A station 321 and B station 322, and the primary approximate line 323 will be taken as epsilon.

Here, arrangement positions of position information between the P1 and P3 may be set according to the acceptable value of epsilon. In general, the greater the curvature of a curve, the greater the number of points (the number of position information to be used). Let us assume a case of performing determination processing wherein, for example, in the event that error between the position information obtained by the position information obtaining unit 110 and the modeled route thereof is less than 50 m, determination is made that the wireless communication apparatus 100 exists on the route thereof. In this case, for example, modeling is performed so that epsilon becomes 25 m or less.

The method for setting position information is not restricted to this, and another setting may be performed. For example, the arrangement positions of position information may be set for each fixed interval (e.g., 25 m), or may be set with a variable interval.

"Storage Contents Example of Communication Quality Information Storage Unit"

FIG. 6 is a diagram schematically illustrating an example of storage contents of the communication quality information storage unit 200 according to the first embodiment of the present technology.

Line ID 201, latitude 202, longitude 203, and SNR (Signal to Noise Power Ratio) 204 are stored in the communication quality information storage unit 200 in a correlated manner for each telecommunications carrier.

The line ID 201 is identification information for identifying a line. Note that the line ID 201 corresponds to the line ID 121 illustrated in FIG. 3.

The latitude 202 is latitude for specifying a position in a line, and the longitude 203 is longitude for specifying a position in the line.

The SNR 204 is communication quality in a line. Note that The SNR widely encompasses conception of SINR (Signal to Interference and Noise power Ratio) in which interference signals are included.

In this manner, communication quality (e.g., SNR) in each position on a route (line) according to location information and section information is stored in the communication quality information storage unit 200. This communication quality is, for example, stored with a 500 m interval along a route (line) according to location information and section information. Also, at the time of displaying this communication quality, it is assumed that the user exists in a position sandwiched by two locations, and accordingly, the communication quality of two locations may be averaged and displayed.

Note that FIG. 6 illustrates an example wherein communication quality information relating to multiple telecommunications carriers is stored, but communication quality alone regarding a telecommunications carrier according to the contract authentication information set in the wireless communication apparatus 100 may be stored. Also, let us assume a case where the wireless communication apparatus 100 is a wireless communication apparatus whereby the contract authentication information may be switched. In this case, as illustrated in FIG. 6, communication quality information regarding multiple telecommunications carriers is stored beforehand, and communication quality regarding a telecommunications carrier according to the contract authentication information currently set is used.

Note that, with embodiments of the present technology, as an example of communication quality, description will be made with an example where an SNR is stored in the communication quality information storage unit 200, but one or multiple other communication quality may be stored in the communication quality information storage unit 200.

For example, a RSSI (Received Signal Strength Indicator) may be stored in the communication quality information storage unit 200 as communication quality. Also, for example, the signal strength of a pilot signal, the signal strength of a reference signal, or the signal strength of a beacon signal may be stored as communication quality. Also, for example, a CQI (Channel Quality Indicator) or DRC (Data Rate Control) corresponding to an SNR may be stored as communication quality. Also, for example, an SIR (Signal to Interference Ratio) or SINR (Signal to Interference and Noise Ratio) may be stored as communication quality. Also, for example, an Ec/No (Common Pilot Channel Energy per Chip to Noise Ratio) may be stored as communication quality. Also, for example, an Ex/Io (Common Pilot Channel Energy per Chip to Interference Ratio) may be stored as communication quality. Also, for example, RSRP (Reference Signal Received Power) or RSRQ (Reference Signal Received Quality) may be stored as communication quality. Also, for example, RSCP (Received Signal Code Power) of a serving cell and a peripheral cell thereof may be stored as communication quality. Also, there may be various parameters used for these calculations. Also, any one of these, or two or more communication quality of these may be stored in the communication quality information storage unit 200 in a correlated manner. Note that the serving cell is a cell (base station) to which a wireless communication apparatus is connected using wireless communication, or a cell to be connected, specified by cell search. That is to say, the serving cell means a cell (base station) to be connected.

Here, each of location information in the location information storage unit 120, section information in the section information storage unit 150, and communication quality information in the communication quality information storage unit 200 may be stored in one file format. Also, each information (location information, section information, and communication quality information) may be divided into predetermined units (e.g., area units) and stored in multiple file formats.

Also, location information regarding all districts (e.g., nationwide) may be stored in the location information storage unit 120 beforehand. Alternatively, according to an area where the wireless communication apparatus 100 is within wireless range, information including the area thereof or further including the peripheral area thereof downloaded from another information processing apparatus (e.g., location information providing server) may be stored in the location information storage unit 120 in each case. Also, section information in the section information storage unit 150, and communication quality information in the communication quality information storage unit 200 may also be handled in the same way.

"Configuration Example of Wireless Communication Apparatus"

The first distance calculating unit 130 illustrated in FIG. 1 is configured to calculate distance (first distance) between a position (current position) where the wireless communication apparatus 100 exists and a station (location). Specifically, the first distance calculating unit 130 calculates first distance based on the position information obtained by the position information obtaining unit 110, and location information stored in the location information storage unit 120. The first distance calculating unit 130 outputs information (first distance information) including the calculated first distance, and information (location information) stored in a manner correlated with a station where this first distance has been calculated to the nearest location and section extracting unit 140. Note that location information to be output is, for example, the line ID 121, section ID 122, and station ID 123, illustrated in FIG. 3.

For example, the first distance calculating unit 130 obtains location information including a position specified with position information obtained by the position information obtaining unit 110 and a peripheral thereof from the location information storage unit 120. The first distance calculating unit 130 calculates distance (first distance) between the current position and a station for each station based on the latitude 125 and longitude 126 included in the obtained location information, and latitude and longitude included in the position information obtained by the position information obtaining unit 110.

For example, let us say that the location A 311 in the map illustrated in FIG. 2 is a position where the wireless communication apparatus 100 exists. In this case, each distance between the location A 311 and each of the three stations ("North Berkeley", "Downtown Berkeley", and "Ashby") is calculated. With the example illustrated in FIG. 2, distance between the location A 311 and Downtown Berkeley 302 is the shortest distance, and distance between the location A 311 and North Berkeley 301 is the longest distance.

The nearest location and section extracting unit 140 is configured to extract, based on the first distance information output from the first distance calculating unit 130, the nearest location of the wireless communication apparatus 100 and a route and a section where the wireless communication apparatus 100 exists. The nearest location and section extracting unit 140 outputs the extraction results thereof (including the line ID 121, section ID 122, and station ID 123 illustrated in FIG. 3) to the second distance calculating unit 160, existence-on-route determining unit 170, and route of travel specifying unit 180. Note that the nearest location and section extracting unit 140 is an example of the extracting unit.

For example, the nearest location and section extracting unit 140 extracts a station where the first distance calculated by the first distance calculating unit 130 is the minimum out of the stations corresponding to the first distance information output from the first distance calculating unit 130, and selects this extracted station as the nearest location. In this case, only in the event that the first distance becomes less than a threshold (e.g., 500 m), the nearest location may be selected. That is to say, a station where the first distance calculated by the first distance calculating unit 130 is shorter than a threshold and also the first distance is the minimum is extracted out of the stations stored in the location information storage unit 120, and this extracted station is selected as the nearest location. For example, with the example illustrated in FIG. 2, Downtown Berkeley 302 is taken as the nearest location of the location A 311.

Also, for example, the nearest location and section extracting unit 140 extracts one or multiple sections correlated with the selected nearest location as a section where the wireless communication apparatus 100 exists. Also, the nearest location and section extracting unit 140 extracts the route correlated with the extracted section thereof as a route where the wireless communication apparatus 100 exists.

For example, in the event that the number of sections corresponding to the extracted nearest location is one (e.g., in the event that the nearest location is a terminal station), the nearest location and section extracting unit 140 extracts the one section thereof as a section where the wireless communication apparatus 100 exists. Also, for example, in the event that the number of sections corresponding to the determined nearest location is two or more (e.g., in the event that the nearest location is a nonstop station), the nearest location and section extracting unit 140 extracts the two or more sections thereof as sections where the wireless communication apparatus 100 exists.

For example, the location A 311 in the map illustrated in FIG. 2 is taken as a position where the wireless communication apparatus 100 exists, and Downtown Berkeley 302 is taken as the nearest location. In this case, two sections ("North Berkeley to Downtown Berkeley" and "Downtown Berkeley to Ashby") are taken as sections where the wireless communication apparatus 100 exists.

The second distance calculating unit 160 is configured to calculate distances (second distances) between a position specified with position information obtained by the position information obtaining unit 110 (position where the wireless communication apparatus 100 exists), and the nearest location and the section extracted by the section extracting unit 140. The second distance calculating unit 160 outputs information (second distance information) including the calculated second distances and information (location information) stored in a manner correlated with the section where the second distances have been calculated to the existence-on-route determining unit 170. Note that location information to be output is the line ID 121, section ID 122, and station ID 123 illustrated in FIG. 3, for example.

For example, the second distance calculating unit 160 obtains, from the section information storage unit 150, position information 153 (illustrated in FIG. 4) correlated with one or more sections corresponding to the extraction results (section ID 122 illustrated in FIG. 3) output from the nearest location and section extracting unit 140. Next, the second distance calculating unit 160 calculates, based on the obtained position information 153 (illustrated in FIG. 4) and position information obtained by the position information obtaining unit 110, distance (second distances) between the wireless communication apparatus 100 and each section. For example, there is sequentially calculated distance between a section specified by adjacent two positions in the position information 153 correlated with "NBK01" in the section ID 151 illustrated in FIG. 4 (e.g., a straight line corresponding to a primary approximate expression), and the position where the wireless communication apparatus 100 exists. Here, adjacent two position information in the position information 153 correlated with "NBK01" in the section ID 151 illustrated in FIG. 4 are, for example, "latitude: 35.6373, longitude: 139.6908", and "latitude: 35.6357, longitude: 139.6895". Similarly, there is sequentially calculated distance between a section specified by adjacent two positions in the position information 153 correlated with "DBK02" in the section ID 151 illustrated in FIG. 4, and the position where the wireless communication apparatus 100 exists.

Note that the second distances may be calculated by another calculating method. For example, an arrangement may be made wherein multiple dimensional approximate expressions are generated based on two position information correlated with a section including the extracted nearest location (e.g., two position information correlated with "NBK01" in the section ID 151 illustrated in FIG. 4), and distances (second distances) between position information obtained from the generated approximate expressions (e.g., straight lines corresponding to the approximate expressions) and the position where the wireless communication apparatus 100 exists is calculated.

The existence-on-route determining unit 170 is configured to determine, based on the second distances calculated by the second distance calculating unit 160, whether or not the wireless communication apparatus 100 exists on the route including the nearest location and the nearest location extracted by the section extracting unit 140. Next, the existence-on-route determining unit 170 outputs the determination result thereof and the location information (including line ID 121, section ID 122, and station ID 123 illustrated in FIG. 3) to the route of travel specifying unit 180. Note that the existence-on-route determining unit 170 is an example of the determining unit.

For example, the existence-on-route determining unit 170 determines that the wireless communication apparatus 100 exists on the route including the nearest location, in the event that of the second distances calculated by the second distance calculating unit 160, the second distance serving as the minimum is small with reference to a threshold (e.g., in the event of being equal to or smaller than a threshold). Here, 50 m may be set as the threshold, for example. Note that, with regard to the threshold, another value may be employed, or the threshold may be changed by a user's setting. For example, in the event of increasing the precision of existence-on-route determination processing, a small value (e.g., 20 m to 40 m) may be set as the threshold, and in the event of decreasing the precision of existence-on-route determination processing, a large value (e.g., 60 m to 100 m) may be set as the threshold.

In this manner, one route may be specified out of multiple routes stored in the wireless communication apparatus 100, and determination may be made regarding whether or not the wireless communication apparatus 100 is traveling along the route thereof.

The route of travel specifying unit 180 is configured to specify a direction (direction of travel) where the wireless communication apparatus 100 moves, on the route where the wireless communication apparatus 100 has been determined to exist by the existence-on-route determining unit 170, and to specify the route of travel of the wireless communication apparatus 100. Next, the route of travel specifying unit 180 outputs information relating to the route thereof (including the line ID 121, section ID 122, and station ID 123 illustrated in FIG. 3), and route of travel information including the specified direction of travel and route of travel to the communication quality obtaining unit 190. Here, the route of travel is a route where the wireless communication apparatus 100 is predicted to move, and is specified out of one or multiple routes which have been set beforehand.

Now, an example of a method for specifying a direction of travel will be described.

For example, with the example illustrated in FIG. 2, let us assume a case where the wireless communication apparatus 100 moves from the location A 311 to the location B 312. In this case, in the event that the wireless communication apparatus 100 exists on the location A 311, the nearest location and section extracting unit 140 extracts Downtown Berkeley 302 as the nearest location of the wireless communication apparatus 100. Also, the route of travel specifying unit 180 holds the extraction result (nearest location "Downtown Berkeley"). Next, in the event that the wireless communication apparatus 100 has moved to the location B 312, the nearest location and section extracting unit 140 extracts Ashby 303 as the nearest location of the wireless communication apparatus 100. Also, the route of travel specifying unit 180 holds the extraction result thereof (nearest location "Ashby"). In this manner, the nearest location and section extracting unit 140 extracts multiple different nearest locations based on multiple position information obtained at different time, and position information included in location information, of position information obtained by the position information obtaining unit 110. Also, the nearest location and section extracting unit 140 extracts two sections "Downtown Berkeley to Ashby" and "Ashby to MacArthur (not illustrated)" as sections including the nearest location "Ashby".

Next, the route of travel specifying unit 180 specifies a section "Downtown Berkeley to Ashby" including the two held nearest locations (the last nearest location "Downtown Berkeley" and the current nearest location "Ashby") out of the sections extracted by the nearest location and section extracting unit 140. Next, the route of travel specifying unit 180 specifies, based on the sequence of the two held nearest locations, a direction of travel in the section "Downtown Berkeley to Ashby". For example, in the event that the sequence of the two held nearest locations is Downtown Berkeley towards Ashby (e.g., in the event that the last nearest location "Downtown Berkeley" and the current nearest location "Ashby"), "Downtown Berkeley towards Ashby" is specified as the direction of travel. On the other hand, in the event that the sequence of the two held nearest locations is Ashby towards Downtown Berkeley (e.g., in the event that the last nearest location "Ashby" and the current nearest location "Downtown Berkeley"), "Ashby towards Downtown Berkeley" is specified as the direction of travel.

Note that, with the example illustrated in FIG. 2, the wireless communication apparatus 100 moves from the location A 311 to location B 312, and accordingly, "Downtown Berkeley towards Ashby" is specified as the direction of travel.

In this manner, the route of travel specifying unit 180 specifies a route headed to the direction of travel of the wireless communication apparatus 100 from the position where the wireless communication apparatus 100 exists of the routes extracted based on the position where the wireless communication apparatus 100 exists of the multiple routes, as the route of travel. Specifically, the route of travel specifying unit 180 specifies the direction of travel of the wireless communication apparatus 100 on the route where the wireless communication apparatus 100 has been determined to exist, based on the multiple different nearest locations. Next, the route of travel specifying unit 180 specifies a route headed to the specified direction of travel thereof from a position where the wireless communication apparatus 100 exists of the route where the wireless communication apparatus has been determined to exist, as the route of travel. In this manner, the route of travel specifying unit 180 specifies a route including the extracted nearest location as the route of travel. Also, the route of travel specifying unit 180 specifies a route where the wireless communication apparatus 100 has been determined to exist, as the route of travel. That is to say, the route of travel specifying unit 180 specifies the route of travel of the wireless communication apparatus 100 based on the position where the wireless communication apparatus 100 exists. Note that the route of travel specifying unit 180 is an example of the specifying unit.

Note that it is assumed that the same station is continuously determined as the nearest location of the wireless communication apparatus 100 in the event that distance between stations is long, or in the event of the speed of a train is slow, or the like. Therefore, an arrangement may be made wherein the route of travel specifying unit 180 holds the specified direction of travels, and employs the last held direction of travel while the same station in the same route is continuously determined as the nearest location.

The communication quality obtaining unit 190 is configured to obtain communication quality at the current position of the wireless communication apparatus 100 on the route of travel of the wireless communication apparatus 100 from the communication quality information storage unit 200, and to display the obtained communication quality on the display unit 210. For example, communication quality (e.g., SNR 204 illustrated in FIG. 6) correlated with the current position of the wireless communication apparatus 100, and the route of travel of the wireless communication apparatus 100 is obtained from the communication quality information storage unit 200 and displayed on the display unit 210. In this case, for example, the communication quality obtaining unit 190 obtains and displays communication quality in each position situated with a predetermined interval (e.g., 500 m) on the route of travel of the wireless communication apparatus 100.

Here, the route of travel of the wireless communication apparatus 100 is specified based on the current position of the wireless communication apparatus 100 and the direction of travel specified by the route of travel specifying unit 180. For example, let us assume a case where the current position of the wireless communication apparatus 100 is the location B 312, and the direction of travel specified by the route of travel specifying unit 180 is "Downtown Berkeley towards Ashby". The route of travel of the wireless communication apparatus 100 in this case is a route within a predetermined range (e.g., within a range of 2000 m) toward Fremont (for Ashby 303) from the location B 312 in BART. Also, at the time of displaying communication quality on a route of travel, it is assumed that the user exists in a position sandwiched with two locations, and accordingly, communication quality of two locations may be averaged and displayed.

Note that the communication quality obtaining unit 190 may obtain communication quality alone correlated with a position closest to the current position of the wireless communication apparatus 100 out of communication quality stored in the communication quality storage unit 200 to display this on the display unit 210.

Also, the communication quality obtaining unit 190 may calculate another communication quality using communication quality obtained from the communication quality information storage unit 200 to display this on the display unit 210. For example, an arrangement may be made wherein the communication quality obtaining unit 190 calculates an expected maximum communication rate based on the SNR 204 illustrated in FIG. 6, and displays the calculation result thereof (expected maximum communication rate) on the display unit 210 as communication quality. Note that the communication quality obtaining unit 190 is an example of the output control unit.

Here, with the HSDPA method of the third generation mobile communications system, adaptive modulation coding called AMC (Adaptive Modulation and Coding) is performed. Also, with LTE (Long Term Evolution) and LTE-Advanced as well, adaptive modulation coding called AMC is performed. With these, the modulation method and coding rate are optimized according to propagation characteristic between a base station and a wireless communication apparatus. Therefore, the communication quality obtaining unit 190 may calculate the maximum communication rate to be expected in the event of employing a serving cell according to an obtained SNR. For example, an arrangement may be made wherein CQI (Channel Quality Indicator) is calculated based on the SNR, and the maximum communication rate corresponding to this CQI is set.

Also, according to the value of the SNR, communication quality may be displayed by being classified into two stages or three or more stages.

The display unit 210 is configured to display communication quality obtained by the communication quality obtaining unit 190. With regard to display examples of this, description will be made in detail with reference to FIGS. 7A to 12. Also, other information relating to communication quality may be displayed on the display unit 210. Note that a display panel, for example, such as an organic EL (Electro Luminescence) panel, an LCD (Liquid Crystal Display) panel, or the like may be employed as the display unit 210.

The distance of travel calculating unit 230 is configured to calculate distance of travel of the wireless communication apparatus 100 based on position information obtained by the position information obtaining unit 110, and to output the calculated distance of travel to the acquisition frequency control unit 240 and type of travel determining unit 250. For example, the distance of travel calculating unit 230 uses position information obtained at different two periods of time (e.g., one minute interval) on the time sequence of position information obtained by the position information obtaining unit 110 to calculate distance of travel between position information thereof (e.g., distance of travel per one minute (unit time)).

The acquisition frequency control unit 240 is configured to control acquisition frequency of position information by the position information obtaining unit 110 based on the distance of travel calculated by the distance of travel calculating unit 230. For example, in the event that it has been calculated by the distance of travel calculating unit 230 that distance of travel per one minute is shorter than 100 m, the acquisition frequency control unit 240 sets five minutes as acquisition frequency of position information by the position information obtaining unit 110. Also, for example, in the event that it has been calculated by the distance of travel calculating unit 230 that distance of travel per one minute is equal to or longer than 500 m, the acquisition frequency control unit 240 sets one minute as acquisition frequency of position information by the position information obtaining unit 110. Note that in the event that it has been calculated by the distance of travel calculating unit 230 that distance of travel per one minute is equal to or longer than 100 m and also shorter than 500 m, the acquisition frequency control unit 240 sets three minutes as acquisition frequency of position information by the position information obtaining unit 110. Note that the setting for acquisition frequency of position information by the acquisition frequency control unit 240 is not restricted to three stages, and may be set to two stages or four or more stages.

In this manner, the acquisition frequency of position information may be controlled according to distance of travel per unit time. Thus, acquisition frequency of position information with a stable interval may be realized. Also, for example, electric power to be consumed for acquisition of position information may be reduced.

Note that, with embodiments of the present technology, an example will be illustrated wherein acquisition frequency of position information by the position information obtaining unit 110 is controlled based on distance of travel per unit time, but another control may be performed. For example, an arrangement may be made wherein determination is made based on distance of travel per unit time whether to execute communication quality acquisition processing, and the units (illustrated by being surrounded with a rectangular dotted line) for executing communication quality acquisition processing are controlled based on the determination result thereof. For example, in the event that distance of travel per unit time is shorter than a threshold, determination is made that there is no movement of the wireless communication apparatus 100, and control may be performed so as not to execute communication quality acquisition processing.

The type of travel determining unit 250 is configured to determine the type of a user's mode of transportation of the wireless communication apparatus 100 based on distance of travel calculated by the distance of travel calculating unit 230, and to output the determination result thereof to the communication quality acquisition processing control unit 260. For example, the type of travel determining unit 250 determines the type of a mode of transportation such as walking, bicycle, bus, train, or the like based on distance of travel per unit time calculated by the distance of travel calculating unit 230.

For example, in the event that distance of travel per one minute is shorter than 100 m, the type of travel determining unit 250 determines that the user's mode of transportation is "walking". Also, in the event that distance of travel per one minute is equal to or longer than 100 m and also shorter than 250 m, the type of travel determining unit 250 determines that the user's mode of transportation is "bicycle". In the event that distance of travel per one minute is equal to or longer than 250 m and also shorter than 650 m, the type of travel determining unit 250 determines that the user's mode of transportation is "bus". Also, in the event that distance of travel per one minute is equal to or longer than 650 m, the type of travel determining unit 250 determines that the user's mode of transportation is "train". Note that the type of travel determining unit 250 may determine the type of the mode of transportation based on an average value (mean distance of travel) of distance of travel (distance of travel per one minute) calculated by the distance of travel calculating unit 230.

Also, instead of distance of travel or mean distance of travel, the type of the mode of transportation may be determined based on the maximum speed. For example, in the event that the maximum speed is slower than 5 km/h, the type of the mode of transportation is determined to be "walking", in the event that the maximum speed is equal to or faster than 5 km/h and also slower than 30 km/h, the type of the mode of transportation is determined to be "bicycle". Also, in the event that the maximum speed is equal to or faster than 30 km/h and also slower than 60 km/h, the type of the mode of transportation is determined to be "bus", and in the event that the maximum speed is equal to or faster than 60 km/h, the type of the mode of transportation is determined to be "train". Also, the type of travel determining unit 250 may widen the type of the mode of transportation to improve determination precision, such as "walking or bicycle", "bicycle or bus", and "bus or train", based on distance of travel, mean distance of travel, and further the maximum speed.

Also, an arrangement may be made wherein features of each mode of transportation of walking, bicycle, but, and train are extracted based on acquisition history of an acceleration sensor preinstalled in many smart phones, and determination of the type of the mode of transportation may be performed based on the features of the acceleration sensor to be obtained at each point-in-time.

Here, in the event of performing the above-mentioned determination processing, for example, there is a possibility that a state in which a train is stopped at a station will erroneously be determined to be "walking". Therefore, in order to prevent stop at a station from being erroneously determined to be "walking", in the event that mean distance of travel per one minute is shorter than 100 m, the number of times of having determined to be shorter than 100 m may be counted. Consequently, only in the event that the count number becomes equal to or greater than a threshold, this is determined to be "walking", and in the event that the count number is smaller than the threshold, determination processing is repeatedly performed without determining this as "walking". Thus, there may be reduced a possibility that stop at a station will erroneously be determined to be "walking". Also, this count processing may be performed only when the type of the mode of transportation is determined to be "bus" or "train".

The communication quality acquisition processing control unit 260 is configured to determine whether to execute communication quality acquisition processing based on the determination result of the type of travel determining unit 250, and to control the units (illustrated by being surrounded with a rectangular dotted line) configured to execute communication quality acquisition processing, based on the determination result. For example, acquisition frequency of communication quality by the communication quality obtaining unit 190 or the like is controlled.

For example, in the event that a user who is carrying the wireless communication apparatus 100 is walking, it is assumed that the distance of travel is relatively short, it is thought that communication quality of a destination of travel does not have to be displayed. Therefore, for example, in the event that the determination result of the type of travel determining unit 250 is "walking", controls is performed so as not to execute the communication quality acquisition processing. On the other hand, in the event that the determination result of the type of travel determining unit 250 is other than "walking" (e.g., bicycle, bus, or train), control is performed so as to execute the communication quality acquisition processing. Note that the communication quality acquisition processing control unit 260 is an example of the acquisition frequency control unit.

In this manner, the mode of transportation (railway, shuttle bus, taxi, car, bicycle, walking, etc.) of the user who is carrying the wireless communication apparatus 100 may be specified, and determination may be made whether or not the mode of transportation thereof is traveling along a particular route. Also, determination processing regarding whether or not there is a user on the route who is carrying the wireless communication apparatus 100 may be performed only for a particular mode of transportation (e.g., other than walking). Thus, load of the processing at the wireless communication apparatus 100 may be reduced, and consumption power may be effectively utilized.

"Example for Displaying Communication Quality with Five Stages"

FIGS. 7A to 8C are diagrams illustrating an example of a display screen to be displayed on the display unit 210 according to the first embodiment of the present technology.

A display screen 400 is a display screen configured to display communication quality obtained by the communication quality obtaining unit 190. With the display screen 400, for example, a battery icon display area 401, a point-in-time display area 402, an antenna bar display area 403, and a communication quality display area 405 are provided.

Figure 7A:
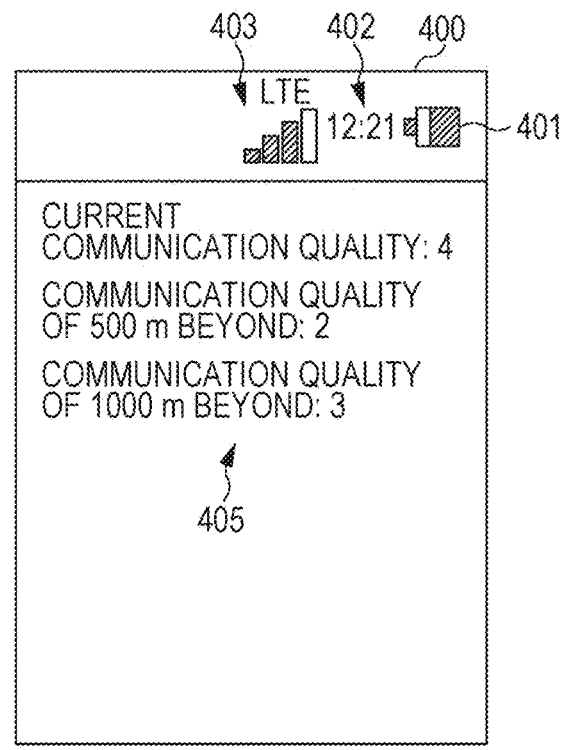
FIGS. 7A and 7B are diagrams illustrating an example of a display screen to be displayed on a display unit according to the first embodiment of the present technology.

FIG. 7A illustrates an example wherein communication quality on a route of travel of the wireless communication apparatus 100 is displayed on the communication quality display area 405 with five stages (1: worst, 2: bad, 3: ordinary, 4: excellent, 5: best) for each 500 m. Specifically, each communication quality at the current position of the wireless communication apparatus 100, a position 500 m ahead from this current position, and a position 1000 m ahead from the current position is displayed on the communication quality display area 405 with five stages. Specifically, with the example illustrated in FIG. 7A, a display example is illustrated in the event that community quality has deteriorated at 500 m ahead from the current location, and communication quality at 1000 m ahead has slightly improved.

Figure 7B:
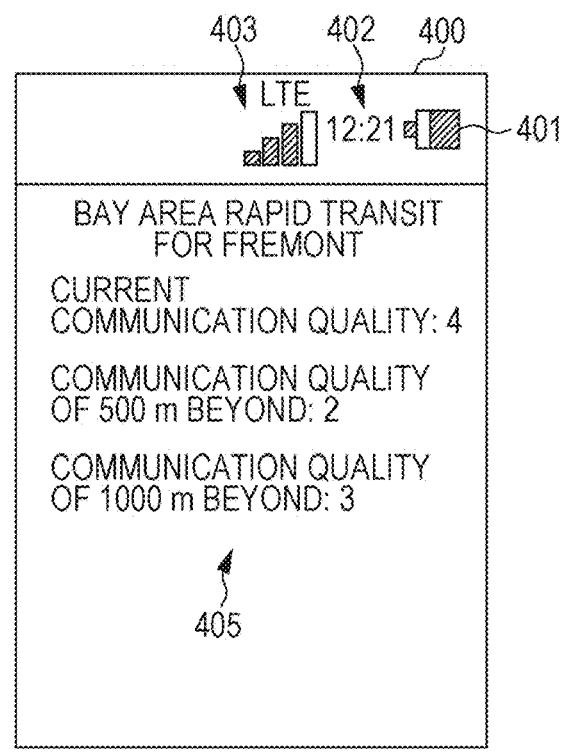

FIG. 7B illustrates an example wherein a railway line name and a direction of travel (direction of travel) are displayed on the communication quality display area 405 illustrated in FIG. 7A. In this manner, the railway line name (BART), direction of travel (for Fremont) are displayed, whereby the user may readily recognize which level communication quality displayed for each 500 m belongs to. Note that the railway line name and direction of travel may be displayed based on location information stored in the location information storage unit 120.

"Example for Displaying Communication Quality by Text"

Figure 8A:
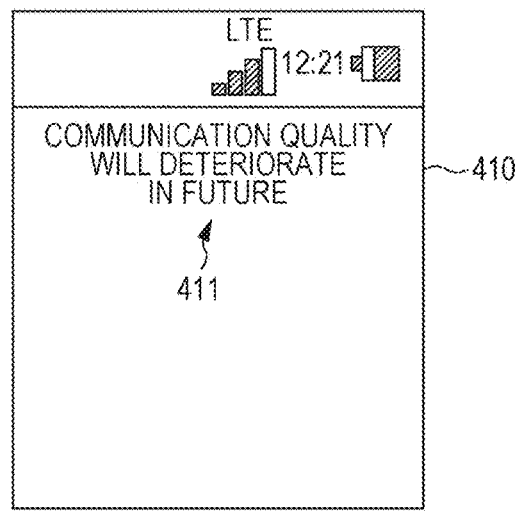
FIGS. 8A, 8B and 8C are diagrams illustrating an example of a display screen to be displayed on the display unit according to the first embodiment of the present technology.
Figure 8B:
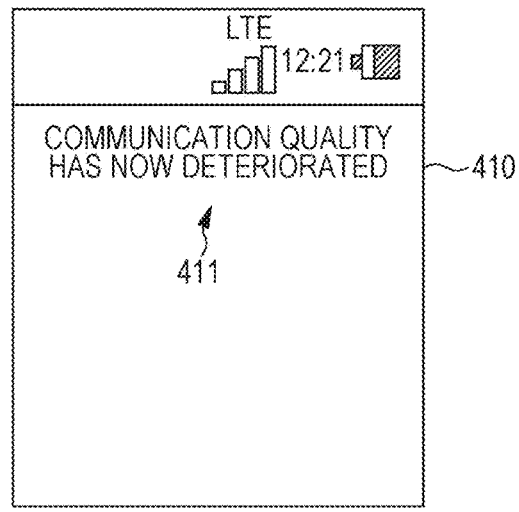
Figure 8C:
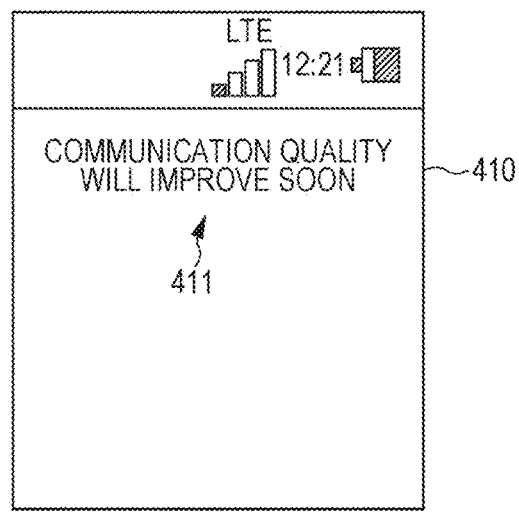

FIGS. 8A to 8C illustrate an example wherein communication quality on a route of travel of the wireless communication apparatus 100 is displayed on the communication quality display area 405 by text. That is to say, an example is illustrated in FIGS. 8A to 8C wherein communication quality is display by text.

Specifically, FIG. 8A illustrates a display example in a case where communication quality at a destination of travel of the wireless communication apparatus 100 has deteriorated. FIG. 8B illustrates a display example in a case where the current communication quality has deteriorated. FIG. 8C illustrates a display example in a case where communication quality at the destination of travel of the wireless communication apparatus 100 has improved. Note that display examples illustrated in FIGS. 7A to 8C are an example, and communication quality on a route of travel of the wireless communication apparatus 100 may be displayed by another display mode whereby similar information may be provided to the user. These display examples are illustrated in FIGS. 9A to 12.

"Example for Displaying Communication Quality and Others in Line Graph Format"

FIGS. 9A to 10B are diagrams illustrating an example of a display screen to be displayed on the display unit 210 according to the first embodiment of the present technology. FIGS. 9A to 10B illustrate an example wherein communication quality is displayed in a line graph format.

Figure 9A:
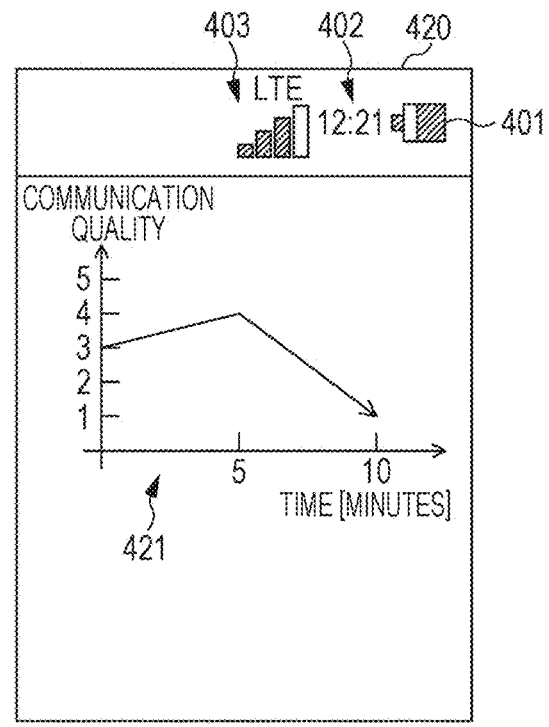
FIGS. 9A and 9B are diagrams illustrating an example of a display screen to be displayed on the display unit according to the first embodiment of the present technology.
Figure 9B:
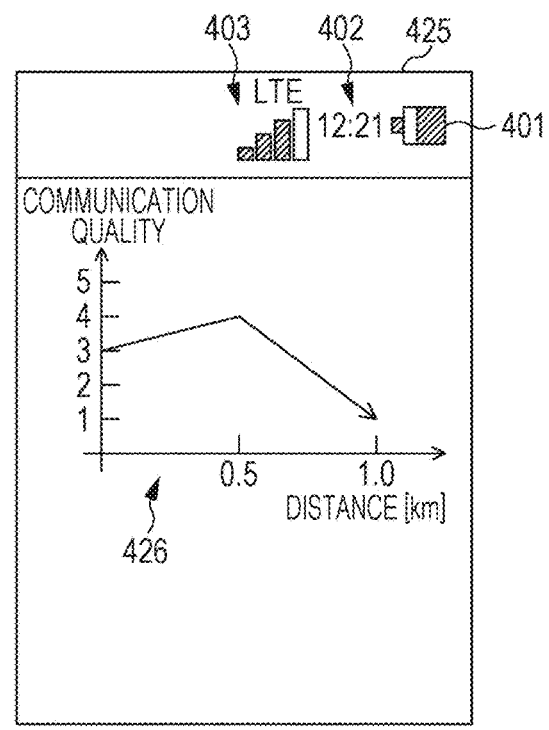

FIG. 9A illustrates an example (display screen 420) wherein communication quality is displayed in time sequence with five stages by taking the horizontal axis as time and the vertical axis as an axis that represents communication quality. FIG. 9B illustrates an example (display screen 425) wherein communication quality is displayed with five stages according to distance in a direction of travel by taking the horizontal axis as an axis that represents distance (distance from the current position) and taking the vertical axis as an axis that represents communication quality. In this manner, FIGS. 9A and 9B illustrate an example wherein communication quality on a route of travel of the wireless communication apparatus 100 is displayed on the communication quality display areas 421 and 426 in a line graph format.

Here, time may be obtained by dividing distance in a direction of travel (distance from the current position (e.g., in increments of 500 m)) by distance of travel per unit time calculated by the distance of travel calculating unit 230.

Note that display of communication quality is not restricted to five stages, and may be made with optical stages equal to or greater than two stages.

Figure 10A:
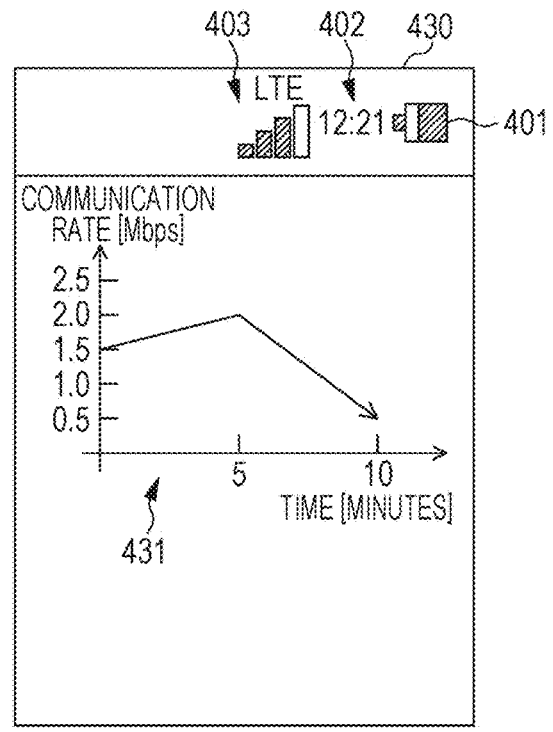
FIGS. 10A and 10B are diagrams illustrating an example of a display screen to be displayed on the display unit according to the first embodiment of the present technology.
Figure 10B:
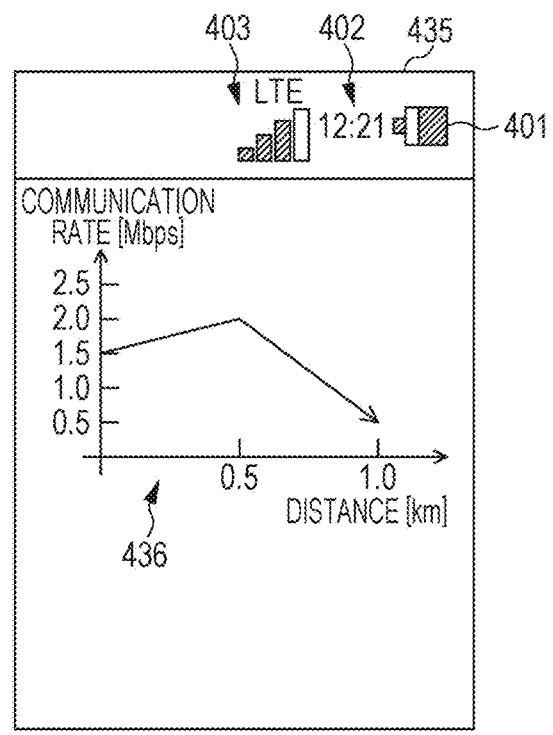

FIG. 10A illustrates an example (display screen 430) wherein a predicted value of a communication rate in time sequence by taking the horizontal axis as an time axis, and taking the vertical axis as a predicted value of a communication rate. FIG. 10B illustrates an example (display screen 435) wherein a predicted value of a communication rate is displayed according to distance in a direction of travel by taking the horizontal axis as an axis that represents distance (distance from the current position) and taking the vertical axis as an axis that represents a predicted value of a communication rate. In this manner, FIGS. 10A and 10B illustrate an example wherein a communication rate on a route of travel of the wireless communication apparatus 100 is displayed on the communication quality display areas 431 and 436 in a line graph format.

Note that the vertical axis is not restricted to communication quality (communication rate) displayed with multiple stages, and may be displayed with SNR, SINR, S/N, Ec/No, Ec/Io, RSSI, RSCP, RSRP, RSRQ, or the like.

For example, display may be switched by the user's setting such as performing display by a predicted communication rate for a common user, performing display by SINR for a user with rich knowledge regarding wireless communication, or the like.

"Example for Displaying Communication Quality and Others by Shading"

Figure 11A:
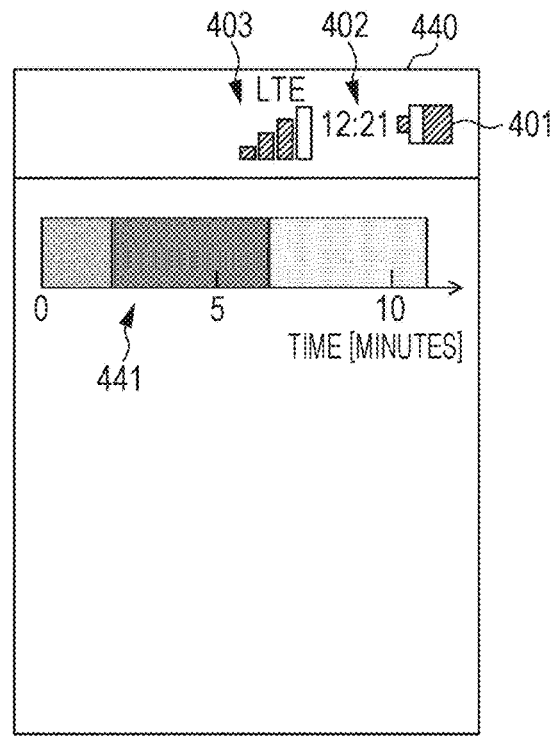
FIGS. 11A and 11B are diagrams illustrating an example of a display screen to be displayed on the display unit according to the first embodiment of the present technology.
Figure 11B:
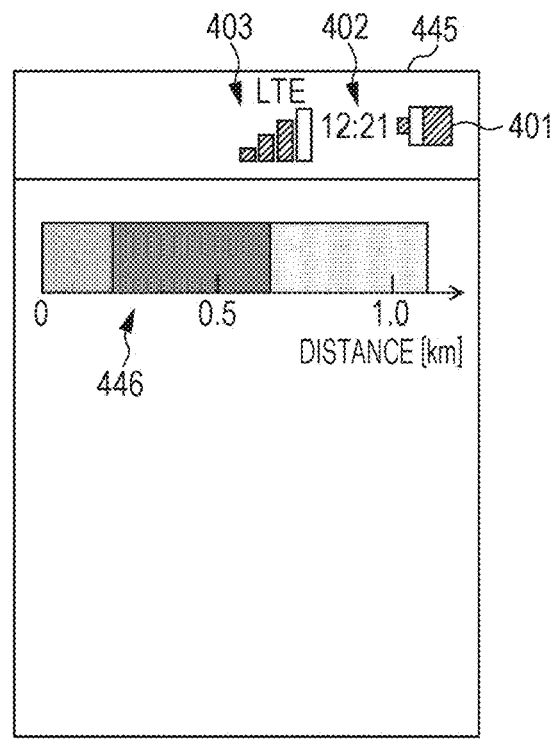

FIGS. 11A and 11B are diagrams illustrating an example of a display screen to be displayed on the display unit 210 according to the first embodiment of the present technology. FIGS. 11A and 11B illustrate an example wherein communication quality or the like is displayed by shading. Also, let us say that the examples in FIGS. 11A and 11B illustrate that the denser color becomes, the more communication quality or a predicted value of a communication rate becomes suitable.

FIG. 11A illustrates an example (display screen 440) wherein the horizontal axis is taken as time axis, and communication quality or a predicted value of a communication rate is displayed by shading in this time axis. FIG. 11B illustrates an example (display screen 445) wherein the horizontal axis is taken as an axis that represents distance (distance from the current position), and communication quality or a predicted value of a communication rate is displayed by shading in this axis. In this manner, FIGS. 11A and 11B illustrate an example wherein communication quality or a predicted value of a communication rate on a route of travel of the wireless communication apparatus 100 is displayed on the communication quality display areas 441 and 446 by shading.

Note that communication quality or a predicted value of a communication rate may be displayed by difference in color instead of shading.

"Example for Displaying Communication Quality and Others on Map by Difference in Color"

FIG. 12 is a diagram illustrating an example (display screen 450) of a display screen to be displayed on the display unit 210 according to the first embodiment of the present technology. FIG. 12 illustrates an example wherein communication quality or the like is displayed on a map by difference in color. Note that FIG. 12 expresses, instead of shading, difference in color using an oblique line or the like.

Specifically, with the display screen 450, the user's current location 460 (a triangle-shaped mark), communication quality information 461 to 465 extending from the current location 460 are provided to onto a map. Here, the communication quality information 461 to 465 extending from the current location 460 display communication quality (e.g., communication rate) on a route of travel (railway line of BART) using difference in color. Also, the communication quality 461 to 465 are situated based on latitude and longitude corresponding to communication quality, and latitude and longitude on the map. Also, a display area 451 where five types of colors corresponding to communication quality to be displayed with five stages are displayed, is provided on the upper left on the map.

Now, as a method for displaying communication quality on a map, a method for displaying a numeric value in each position may be employed other than a method for displaying communication quality using difference in color. Also, the display screens illustrated in FIGS. 7A to 12 may be switched by the user's setting.

Also, the display examples illustrated in FIGS. 7A to 12 are an example, the display contents are not restricted to these, and may be displayed by another display mode. For example, there may be performed meter display, icon display, and display using a widget. Note that the display using a widget is a display method wherein a small window is displayed on the upper right or the like on the display screen, and communication quality or the like is displayed in this small window, for example.

"Operation Example of Wireless Communication Apparatus"

FIG. 13 is a flowchart illustrating an example of a processing procedure of communication-quality-on-route display processing of the wireless communication apparatus 100 according to the first embodiment of the present technology.

First, the position information obtaining unit 110 obtains information (position information) for specifying a position (current position) where the wireless communication apparatus 100 exists (step S901). Next, the first distance calculating unit 130 calculates distance (first distance) between the current position and each location (station) (step S902), based on the position information obtained by the position information obtaining unit 110 and the location information stored in the location information storage unit 120.

Next, the nearest location and section extracting unit 140 determines whether or not there is a location (station) where the first distance calculated by the first distance calculating unit 130 is shorter than a threshold and also the first distance is the minimum (step S903). Here, the threshold may be 500 m, for example. In the event that there is no location (station) where the first distance calculated by the first distance calculating unit 130 is shorter than the threshold and also the first distance is the minimum, the processing returns to step S901. On the other hand, in the event that there is a location (station) where the first distance calculated by the first distance calculating unit 130 is shorter than the threshold and also the first distance is the minimum (step S903), the nearest location and section extracting unit 140 extracts the location (station) thereof as the nearest location (step S904). Also, the nearest location and section extracting unit 140 extracts a section including the nearest location thereof (step S905).

Next, the second distance calculating unit 160 calculates distances (second distances) between the current position, and the nearest location and a section extracted by the section extracting unit 140 (step S906). Next, the existence-on-route determining unit 170 determines, based on the second distances calculated by the second distance calculating unit 160, whether or not there is the wireless communication apparatus 100 on a route including the nearest location and the nearest location extracted by the section extracting unit 140 (steps S907 to S910). That is to say, the second distance serving as the minimum is selected out of the second distances calculated regarding the extracted section (step S907). Next, determination is made regarding whether or not the second distance that has been selected is small with regard go the threshold (step S908). For example, determination is made whether or not the selected second distance is equal to or shorter than the threshold (step S908).

In the event that the selected second distance is greater than the threshold (step S908), the existence-on-route determining unit 170 determines that there is no wireless communication apparatus 100 on the route including the nearest location (step S909), the operation of the communication-quality-on-route display processing is ended. On the other hand, in the event that the selected second distance is equal to or shorter than the threshold (step S908), the existence-on-route determining unit 170 determines that there is the wireless communication apparatus 100 on the route including the nearest location (step S910).

Next, the route of travel specifying unit 180 specifies a direction (direction of travel) where the wireless communication apparatus 100 moves on the route where the wireless communication apparatus 100 has been determined to exist by the existence-on-route determining unit 170, and specifies the route of travel of the wireless communication apparatus 100 (step S911). Note that steps S901 to S911 are an example of a specifying procedure.

Next, the communication quality obtaining unit 190 obtains communication quality in the current position of the wireless communication apparatus 100, and communication quality on the route of travel of the wireless communication apparatus 100, from the communication quality information storage unit 200 (step S912). Next, the communication quality obtaining unit 190 displays the obtained communication quality thereof on the display unit 210 (step S913). For example, the obtained communication quality is displayed as illustrated in FIGS. 7A to 12. Note that steps S912 and S913 are an example of an output control procedure.

FIG. 14 is a flowchart illustrating an example of a processing procedure of communication quality acquisition processing control processing of the wireless communication apparatus 100 according to the first embodiment of the present technology.

First, the position information obtaining unit 110 obtains information (position information) for specifying a position (current position) where the wireless communication apparatus 100 exists (step S921). Next, the distance of travel calculating unit 230 calculates distance of travel of the wireless communication apparatus 100 based on position information obtained by the position information obtaining unit 110 (step S922).

Next, type of travel determination processing is performed (step S930). Note that this type of travel determination processing will be described in detail with reference to FIG. 15.

Next, the communication quality acquisition processing control unit 260 determines whether or not the user's mode of transportation is "walking" (step S923). In the event that the user's mode of transportation is "walking" (step S923), the communication quality acquisition processing is not executed, and accordingly, the processing returns to step S921. On the other hand, in the event that the user's mode of transportation is not "walking" (step S923), the communication quality acquisition processing control unit 260 performs control for executing the communication quality acquisition processing (step S924).

Note that, with this example, an example is illustrated wherein according to whether or not the user's mode of transportation is "walking", determination is made whether to execute the communication quality acquisition processing, but a type other than "walking" may be taken as a determination reference. Also, determination may be made whether to execute the communication quality acquisition processing, using multiple types as determination references. According to whether the user's mode of transportation is "walking" or "bicycle", determination may be made whether to execute the communication quality acquisition processing. Also, it may be taken as a condition that a state in which the user's mode of transportation is a certain type is continued for a certain period of time. For example, only in the event that a state in which the user's mode of transportation is "walking" has been continued for a certain period of time (e.g., five minutes), control may be performed so as not to execute the communication quality acquisition processing.

FIG. 15 a flowchart illustrating an example of a type of travel determination processing procedure (processing procedure in step S930 illustrated in FIG. 14) of the communication quality acquisition processing control processing of the wireless communication apparatus 100 according to the first embodiment of the present technology. Note that, with this processing procedure, an example is illustrated wherein in the event that mean distance of travel per one minute is short than 100 m, the number of times of determination thereof is counted, "walking" is determined based on this count number. Also, with this processing procedure, an example is illustrated wherein the type of the user's mode of transportation is determined using a mean value of distance of travel per one minute (mean distance of travel per one minute).

First, the type of travel determining unit 250 calculates a mean value (mean distance of travel per one minute) of distance of travel (distance of travel per one minute) calculated by the distance of travel calculating unit 230 (step S931). For example, a mean value of three minutes is calculated regarding distance of travel calculated with one minute interval.

Next, the type of travel determining unit 250 determines whether or not mean distance of travel per one minute is shorter than 100 m (step S932), and in the event that mean distance of travel per one minute is shorter than 100 m, the number of times of determining that "shorter than 100 m" is counted (step S933). Next, the type of travel determining unit 250 determines whether or not the count number is equal to or greater than a threshold (step S934), and in the event that the count number is smaller than the threshold, the processing returns to step S931. Here, in the event that determination processing regarding whether or not mean distance of travel per one minute is shorter than 100 m is performed with a three-minute interval, the threshold may be 3 to 5.

Also, in the event that the count number is equal to or greater than the threshold (step S934), the type of travel determining unit 250 determines that the user's mode of transportation is "walking" (step S935).

Also, the type of travel determining unit 250 determines whether or not mean distance of travel per one minute is equal to or longer than 100 m, and also shorter than 250 m (step S936). In the event that mean distance of travel per one minute is equal to or longer than 100 m, and also shorter than 250 m (step S936), the type of travel determining unit 250 determines that the user's mode of transportation is "bicycle" (step S937).

Also, the type of travel determining unit 250 determines whether or not distance of travel per one minute is equal to or longer than 250 m, and also shorter than 650 m (step S938). In the event that distance of travel per one minute is equal to or longer than 250 m, and also shorter than 650 m, the type of travel determining unit 250 determines that the user's mode of transportation is "bus" (step S939).

Also, the type of travel determining unit 250 determines, in the event that distance of travel per one minute is equal to or longer than 650 m (step S938), that the user's mode of transportation is "train" (step S940).

Note that an arrangement may be made wherein the type of travel determining unit 250 obtains a route of travel of the wireless communication apparatus 100 specified by the route of travel specifying unit 180, and uses this route of travel to determine the user's mode of transportation. For example, in the event that the current position of the wireless communication apparatus 100 exists in each location on the route of travel (e.g., station), it is assumed that a train is stopped at a station, and accordingly, the type of travel determining unit 250 may stop determination processing of the user's mode of transportation.

Also, the type of travel determining unit 250 may determine the user's mode of transportation with reference to the obtained route of travel thereof. For example, only in the event that the obtained route of travel is a train line, and also distance of travel per one minute is equal to or longer than 650 m, determination may be made that the user's mode of transportation is "train". Also, for example, only in the event that the obtained route of travel thereof is a bus line, and also distance of travel per one minute is equal to or longer than 250 m and also shorter than 650 m, determination may be made that the user's mode of transportation is "bus".

"Example for Managing Location Information in Increments of Areas"

Now, location information may also be managed in increments of areas. Therefore, hereinafter, an example will be illustrated wherein location information is managed in increments of areas.

FIGS. 16A and 16B are diagrams illustrating an example of each area in the event of managing location information stored in the location information storage unit 270 according to the first embodiment of the present technology in increments of areas.

FIG. 16A illustrates an example of the areas, and FIG. 16B illustrates an example of storage contents of the location information storage unit 270. Note that the location information storage unit 270 is a unit partially deformed from the location information storage unit 120 illustrated in FIG. 3, and accordingly, a portion common to the location information storage unit 120 is denoted with the same reference numeral, and description thereof will be omitted.

As illustrated in FIG. 16A, let us say that location information is managed in increments of areas divided into a rectangular predetermined range. Note that four corners of a rectangle that represents each area are denoted with the corresponding latitude and longitude.

Area information 271 is stored in the location information storage unit 270 illustrated in FIG. 16B. The area information 271 is information corresponding to areas 1 to 9 illustrated in FIG. 16A, in which the number of an area where each location (station) is included is stored.

For example, let us assume a case where position information (latitude: 35.63608, longitude: 139.68985) has been obtained by the position information obtaining unit 110. In this case, the first distance calculating unit 130 calculates first distance using location information alone correlated with an area 5. Specifically, location information alone correlated with "area 5" where position information (latitude: 35.63608, longitude: 139.68985) obtained by the position information obtaining unit 110 is included, is used for calculation of first distance for extracting the nearest location (nearest station). In this manner, first distance relating to the position information of locations (station) of all areas does not have to be obtained at the time of extracting the nearest location by managing location information for each area, but first distance relating to position information of a location (station) included in only the relevant area has to be obtained. Thus, load of processing for extracting the nearest location may significantly be reduced, and consumption power may be effectively used.

2. Second Embodiment

With the first embodiment of the present technology, an example has been illustrated wherein with a wireless communication apparatus, a route of travel is specified, and communication quality on the route of travel thereof is displayed. However, for example, an arrangement may be made wherein a device (e.g., information processing apparatus) other than a wireless communication apparatus specifies a route of travel of a wireless communication apparatus, and displays communication quality on the route of travel thereof on the wireless communication apparatus thereof.

Therefore, with the second embodiment of the present technology, an example will be illustrated wherein a route of travel of a wireless communication apparatus is specified in an information processing apparatus, communication quality on the route of travel thereof is displayed on the wireless communication apparatus thereof.

"Configuration Example of Communication System"

FIG. 17 is a block diagram illustrating a functional configuration example of a communication system 500 according to the second embodiment of the present technology.

The communication system 500 includes a public telephone network 510, a communication controller 520, base stations 521 and 522, wireless communication apparatuses 531 to 534, and an information processing apparatus 600.

The public telephone network 510 is a public telephone network such as a telephone network, the Internet, or the like. Also, the public telephone network 510 and communication controller 520 are connected via a gateway (not illustrated).

The base stations 521 and 522 are base stations operated by a telecommunications carrier. Specifically, the base stations 521 and 522 are mobile communication base stations (NodeB or eNodeB) which connect a wireless communication apparatus which holds contract authentication information according to the telecommunications carrier thereof, and the communication controller 520 operated by the telecommunications carrier thereof via a wireless line.

Also, FIG. 17 illustrates, for ease of description, only one telecommunications carrier (telecommunications carrier who operates the communication controller 520), but this may similarly be applied to a case where there are two or more telecommunications carriers. Also, FIG. 17 illustrates, for ease of description, the base stations 521 and 522 alone as base stations operated by the telecommunications carrier thereof, but this may also similarly be applied to a case where the number of base stations operated by the telecommunications carrier thereof is one or three or more. Also, in the event that the telecommunications carrier thereof operates two or more base stations, these may be operated with different carrier frequencies and different communication systems.

The communication controller 520 is a communication controller managed by a telecommunications carrier who provides a wireless connection service, and performs authentication control of a wireless communication apparatus to be connected via the base stations 521 and 522. Next, the communication controller 520 connects the authenticated wireless communication apparatus to the public telephone network 510 via a gateway (not illustrated).

Here, the communication controller 520 authenticates, of wireless communication apparatuses to be connected via the base stations 521 and 522, only a wireless communication apparatus which holds contract authentication information according to the telecommunications carrier who operates the communication controller 520 except for a particular case. Note that the particular case is, for example, a case where call origination is performed for urgent use (e.g., a case of call origination for a police office or fire department or the like).

Also, the communication controller 520 outputs various types of information to be transmitted from the wireless communication apparatuses 531 to 534 via the base stations 521 and 522, to the information processing apparatus 600. Also, the communication controller 520 transmits various types of information to be output from the information processing apparatus 600 to the wireless communication apparatuses 531 to 534 via the base stations 521 and 522.

"Configuration Example of Information Processing Apparatus"

FIG. 18 is a block diagram illustrating a functional configuration example of the information processing apparatus 600 according to the second embodiment of the present technology.

The information processing apparatus 600 includes a position information obtaining unit 611, a location information storage unit 612, a first distance calculating unit 613, a nearest location and section extracting unit 614, a section information storage unit 615, and a second distance calculating unit 616. Also, the information processing apparatus 600 includes an existence-on-route determining unit 617, a route of travel specifying unit 618, a communication quality obtaining unit 619, a communication quality information storage unit 620, a transmission control unit 621, and a communication unit 622. Note that the position information obtaining unit 611 to the communication quality information storage unit 620 correspond to the units having the same name in the wireless communication apparatus 100 illustrated in FIG. 1. Therefore, hereinafter, the units common to the wireless communication apparatus 100 will be described with points different from the wireless communication apparatus 100 as the center, and other description will be omitted.

Now, let us say that the wireless communication apparatuses 531 to 534 illustrated in FIG. 17 transmit a communication quality acquisition request to the information processing apparatus 600 at a fixed or variable cycle. The communication quality acquisition request includes position information obtained by each wireless communication apparatus. Also, in the event of having received the communication quality acquisition request thereof, the information processing apparatus 600 uses position information included in the communication quality acquisition request thereof to obtain communication quality according to the communication quality acquisition request thereof. The information processing apparatus 600 transmits information regarding this obtained communication quality to the wireless communication apparatus which has transmitted the communication quality acquisition request thereof.

The communication unit 622 is configured to perform transmission/reception of various types of information with the wireless communication apparatuses 531 to 534 via the base stations 521 and 522 operated by the telecommunications carrier (telecommunications carrier who operates the communication controller 520). For example, in the event of having received a communication quality acquisition request from the wireless communication apparatuses 531 to 534, the communication unit 622 transmits the received communication quality acquisition request to the position information obtaining unit 611.

The position information obtaining unit 611 is configured to obtain position information included in information transmitted from the wireless communication apparatuses 531 to 534 via the communication unit 622. Here, in the event of obtaining position information from multiple wireless communication apparatuses, the position information obtaining unit 611 reorganizes position information for each wireless communication apparatus in time sequence.

The transmission control unit 621 is configured to perform control for transmitting information regarding communication quality (communication quality corresponding to each position on a route of travel) obtained by the communication quality obtaining unit 619 to the wireless communication apparatus which has transmitted a communication quality acquisition request, via the communication unit 622. Here, the information regarding communication quality to be transmitted to the wireless communication apparatus includes information regarding each position on the route of travel.

In this manner, with the second embodiment of the present technology, a wireless communication apparatus performs acquisition of position information, and transmission of a communication quality acquisition request including this, and the information processing apparatus 600 performs various processes for obtaining communication quality on a route of travel of the wireless communication apparatus thereof. Therefore, load of each process at a wireless communication apparatus may be markedly reduced, and consumption power may be effectively utilized.

3. Third Embodiment

With the first and second embodiments of the present technology, an example has been illustrated wherein a route of travel of a wireless communication apparatus is specified at an information processing apparatus or wireless communication apparatus, and communication quality on the route of travel thereof is displayed on the wireless communication apparatus thereof. Here, it is conceived that a wireless communication apparatus and an information processing apparatus collaborate to update location information, section information, and communication quality information, whereby further optimal information may be provided to a user.

Therefore, with a third embodiment of the present technology, an example will be illustrated wherein a wireless communication apparatus and an information processing apparatus collaborate to update location information, section information, and communication quality information at a fixed or variable cycle. Note that a communication system according to the third embodiment of the present technology corresponds to the communication system 500 illustrated in FIG. 17. For example, a wireless communication apparatus 700 illustrated in FIG. 19 corresponds to the wireless communication apparatuses 531 to 534 illustrated in FIG. 17, and an information processing apparatus 750 illustrated in FIG. 20 corresponds to the information processing apparatus 600 illustrated in FIG. 17.

"Configuration Example of Wireless Communication Apparatus"

FIG. 19 is a block diagram illustrating a functional configuration example of the wireless communication apparatus 700 according to the third embodiment of the present technology. Note that the wireless communication apparatus 700 is an apparatus partially deformed from the wireless communication apparatus 100 illustrated in FIG. 1. Accordingly, the units common to the wireless communication apparatus 100 are denoted with the same reference numerals, and description thereof will be omitted.

The wireless communication apparatus 700 includes a communication quality detecting unit 701, a wireless communication unit 702, and an updating unit 703.

The communication quality detecting unit 701 is configured to detect communication quality in a position (current position) where the wireless communication apparatus 700 exists, and to supply the detected communication quality to the wireless communication unit 702.

Now, the communication quality detected by the communication quality detecting unit 701 may be a Received Signal Strength Indicator (RSSI), Signal to Interference Ratio (SIR), SINR, S/N, Ec/No, Ec/Io, RSRP, RSRQ, or various parameters used for these calculations. Also, the communication quality may include the RSCP (Received Signal Code Power) of a serving cell and a peripheral cell.

The wireless communication unit 702 is configured to perform transmission/reception of various types of information (e.g., audio data and image data) with a base station (base station operated by a telecommunications carrier) which provides a communication service, and to supply received information to the units. For example, the wireless communication unit 702 performs wireless communication using a 3G network based on contract authentication information (valid contract authentication information) stored in the wireless communication apparatus 700. Also, the wireless communication unit 702 transmits information (communication quality information) in which communication quality detected by the communication quality detecting unit 701, and position information obtained by the position information obtaining unit 110 are correlated to the information processing apparatus 750 (illustrated in FIG. 20) at a fixed or variable cycle. Also, the wireless communication unit 702 receives location information, section information, and communication quality information to be provided from the information processing apparatus 750 (illustrated in FIG. 20) at a fixed or variable cycle and outputs to the updating unit 703. Note that the wireless communication unit 702 is an example of the transmission control unit included in the wireless communication apparatus.

The updating unit 703 is configured to update various types of information (location information, section information, and communication quality information) stored in the location information storage unit 120, section information storage unit 150, and communication quality information storage unit 200. For example, the updating unit 703 obtains information (location information, section information, or communication quality information) to be provided from the information processing apparatus 750 (illustrated in FIG. 20). Next, the updating unit 703 updates storage contents of the storage unit (location information storage unit 120, section information storage unit 150, or communication quality information storage unit 200) according to the obtained information. In this case, all of the obtained information may be updated by overwriting, or only a modified portion of the last contents may be updated by overwriting.

The route of travel specifying unit 180 specifies a route of travel of the wireless communication apparatus 100 based on various types of information (i.e., updated various types of information (location information and section information)) transmitted from the information processing apparatus 750, and position information obtained by the position information obtaining unit 110.

The communication quality obtaining unit 190 obtains communication quality on the route of travel from communication quality information (i.e., updated communication quality information) transmitted from the information processing apparatus 750 and displays on the display unit 210.

Note that communication quality in the current position detected by the communication quality detecting unit 701 may be displayed on the display unit 210 along with communication quality on the route of travel obtained by the communication quality obtaining unit 190. Note that estimated values of the degree of congestion of serving cells, and the free space of a base station may be displayed as communication quality in the current position.

"Configuration Example of Information Processing Apparatus"

FIG. 20 is a block diagram illustrating a functional configuration example of the information processing apparatus 750 according to the third embodiment of the present technology.

The information processing apparatus 750 includes a communication unit 751, a communication quality obtaining unit 752, a route information storage unit 753, and a communication quality calculating unit 754. Also, the information processing apparatus 750 includes a communication-quality-on-route storage unit 755, a location-information-for-each-route storage unit 756, a section-information-for-each-route storage unit 757, an updating unit 758, and a transmission control unit 759.

The communication unit 751 is configured to perform transmission/reception of various types of information with the wireless communication apparatus 700 via a base station operated by a telecommunications carrier. For example, in the event of having received communication quality information from the wireless communication apparatus 700, the communication unit 751 outputs the received communication quality information to the communication quality obtaining unit 752.

The communication quality obtaining unit 752 is configured to obtain communication quality and position information included in the communication quality information transmitted from the wireless communication apparatus 700, via the communication unit 751, and to output the obtained communication quality and position information to the communication quality calculating unit 754.

The route information storage unit 753 is configured to store information (route information) regarding a predetermined route, and to supply stored route information to the communication quality calculating unit 754 and updating unit 758. This route information is, for example, location information illustrated in FIG. 3, section information illustrated in FIG. 4, and line ID 201, latitude 202, and longitude 203 illustrated in FIG. 6.

The communication quality calculating unit 754 is configured to calculate communication quality on a route by averaging communication quality obtained by the communication quality obtaining unit 752 regarding each position specified by route information stored on the route information storage unit 753. The communication quality calculating unit 754 then stores the calculated communication quality in the communication-quality-on-route storage unit 755. That is to say, the communication quality calculating unit 754 performs updating of communication quality information stored in the communication-quality-on-route storage unit 755 using communication quality information transmitted from the wireless communication apparatus 700. Note that the communication quality calculating unit 754 is an example of the updating unit included in the information processing apparatus.

Note that, with this example, communication quality information alone transmitted from the single wireless communication apparatus 700 is used, but the communication quality calculating unit 754 may calculate communication quality on a route using communication quality information transmitted from multiple wireless communication apparatuses. In this case, an average value of communication quality is sequentially calculated for each position.

The communication-quality-on-route storage unit 755 is configured to store communication quality on a route calculated by the communication quality calculating unit 754, and to supply the stored communication quality to the transmission control unit 759. Note that information stored in the communication-quality-on-route storage unit 755 is transmitted to the wireless communication apparatus 700 via the communication unit 751 at a fixed or variable cycle, and is used for updating of communication quality information in the communication quality information storage unit 200 of the wireless communication apparatus 700.

The location-information-for-each-route storage unit 756 is configured to store information regarding a location for each route (location information), and to supply the stored location information to the transmission control unit 759.

The section-information-for-each-route storage unit 757 is configured to store section information for each route, and to supply the stored section information for each route to the transmission control unit 759.

The updating unit 758 is configured to perform updating of information in the location-information-for-each-route storage unit 756 and information in the section-information-for-each-route storage unit 757.

The transmission control unit 759 is configured to perform control for transmitting each information in the communication-quality-on-route storage unit 755, location-information-for-each-route storage unit 756, and information in the section-information-for-each-route storage unit 757 to the wireless communication apparatus 700 via the communication unit 751.

For example, in the event that there has been change in location information on a route included on the route information storage unit 753, the updating unit 758 performs updating of information regarding a location for each route stored in the location-information-for-each-route storage unit 756.

Also, in the event that there has been updating in location information for each route stored in the location-information-for-each-route storage unit 756, the transmission control unit 759 transmits information according to updating thereof to the wireless communication apparatus 700 via the communication unit 751. Thus, updating of location information in the location information storage unit 120 of the wireless communication apparatus 700 is performed. This updating processing may be performed each time the location-information-for-each-route storage unit 756 is updated, or may be performed at a fixed or variable cycle. Also, only in the event that information according to the last updating date of location information in the location information storage unit 120 has been obtained from the wireless communication apparatus 700, and thereafter, updating has occurred, location information in the location information storage unit 120 of the wireless communication apparatus 700 may be updated.

Also, for example, in the event that there has been change in a location on a route included on the route information storage unit 753, or position information on the route, the updating unit 758 performs updating of section information for each route stored in the section-information-for-each-route storage unit 757.

Also, in the event that there has been updating in section information for each route stored in the section-information-for-each-route storage unit 757, the transmission control unit 759 transmits information according to updating thereof to the wireless communication apparatus 700 via the communication unit 751. Thus, updating of section information in the section information storage unit 150 of the wireless communication apparatus 700 is performed. This updating processing may be performed each time the location-information-for-each-route storage unit 756 is updated, or may be performed at a fixed or variable cycle. Also, only in the event that information according to the last updating date of section information in the section information storage unit 150 has been obtained from the wireless communication apparatus 700, and thereafter, updating has occurred, section information in the section information storage unit 150 of the wireless communication apparatus 700 may be updated.

4. Fourth Embodiment

With the first to third embodiments of the present technology, an example has been illustrated wherein communication quality information for obtaining communication quality in a route of travel is obtained from another apparatus (e.g., information processing apparatus) or the like. Here, a wireless communication apparatus may detect predetermined communication quality, and accordingly, the user walks around with the wireless communication apparatus, whereby communication quality of a traveled route thereof may be obtained.

Therefore, with a fourth embodiment of the present technology, an example will be illustrated wherein communication quality information is obtained and stored using a wireless communication apparatus. That is to say, an example will be illustrated wherein processing is performed in a closed state within the wireless communication apparatus.

"Configuration Example of Wireless Communication Apparatus"

FIG. 21 is a block diagram illustrating a functional configuration example of a wireless communication apparatus 800 according to the fourth embodiment of the present technology. Note that the wireless communication apparatus 800 is an apparatus partially deformed from the wireless communication apparatus 100 illustrated in FIG. 1. Accordingly, the units common to the wireless communication apparatus 100 are denoted with the same reference numerals, and description thereof will partially be omitted.

The wireless communication apparatus 800 includes a communication quality detecting unit 801, a route information storage unit 802, and a communication quality calculating unit 803. Note that the communication quality detecting unit 801 corresponds to the communication quality detecting unit 701 illustrated in FIG. 19.

The route information storage unit 802 is configured to store information regarding a predetermined route (route information), and to supply stored route information to the communication quality calculating unit 803. This route information is, for example, the line ID 201, latitude 202, and longitude 203 illustrated in FIG. 6.

The communication quality calculating unit 803 calculates communication quality on a route by averaging communication quality detected by the communication quality detecting unit 801 regarding each position specified by route information stored on the route information storage unit 802. The communication quality calculating unit 803 performs updating of communication quality information in the communication quality information storage unit 200 using information regarding the calculated communication quality on the route. Note that this updating processing may be performed each time communication quality on a route is calculated, or may be performed at a fixed or variable cycle.

In this manner, communication quality in each position on a route where the wireless communication apparatus 800 has passed through is sequentially obtained, whereby communication quality information on the route where the wireless communication apparatus 800 has passed through may sequentially be stored. In the event of moving again to a route of which the communication quality information has been stored, the user of the wireless communication apparatus 800 may display communication quality on the route of travel using the stored communication quality information thereof.

For example, a user who possesses the wireless communication apparatus 800 moves by riding on the trains in the capital region, the user may obtain communication quality information for each of the train lines. In the event of moving again to a route (e.g., a line used for communication, a line used for vacation trips) of which the communication quality information has been stored, the user of the wireless communication apparatus 800 may display communication quality on the route of travel using the stored communication quality information thereof.

Also, communication quality information individually obtained may be exchanged with another person. For example, communication quality information individually obtained is exchanged between a user who lives near Ashby and a user who lives Fremont, whereby communication quality information regarding a line near Ashby and a line near Fremont may readily be obtained.

In recent years, various wireless communication systems have been being reorganized. Also, various servers from a small capacity service to a large capacity service have been available for users. However, for example, a cell edge (a border line between sells) is low in received signal strength or receives influence of interference from another cell on arrangement of base stations, and accordingly, in general, which is frequently poor in communication quality. Accordingly, for example, in the event that a user moves and comes to such an area (cell edge), it is assumed that it becomes difficult for the user to receive a service with sufficient communication quality. Therefore, it is important for the user who is moving to readily recognize communication quality of a destination of travel.

Therefore, with embodiments of the present technology, communication quality in a predetermined route may be predicted using a distribution of communication quality and position information and may be provided to the user. That is to say, for a user who is moving on a fixed route, there may be provided predicted information of communication quality of a destination of travel thereof. Also, read-ahead of communication quality on a fixed route may be realized.

Also, communication quality of a destination of travel on a route where a wireless communication apparatus has been determined to exist may be informed to the user, and accordingly, the user may be induced to perform action for avoiding communication in a place with a poor communication situation, and wireless communication resources may be effectively utilized. Also, communication capacity may equivalently be expanded.

Note that, with the embodiments of the present technology, an example has been illustrated wherein there is provided to a user only communication quality regarding a telecommunications carrier according to contract authentication information set to a wireless communication apparatus. However, there may also be provided to a user communication quality regarding a telecommunications carrier other than a telecommunications carrier according to contract authentication information set to a wireless communication apparatus. For example, in the event of displaying communication quality on a route of travel, communication quality regarding multiple telecommunications carriers may be displayed so as to be comparable. For example, in the event of employing a wireless communication apparatus where switching of contract authentication information may be made, switching of contract authentication information may suitably be performed with reference to communication quality at a destination of travel of the wireless communication apparatus.

Note that, with the embodiments of the present technology, description has been made with an information processing apparatus integrally configured (e.g., information processing apparatuses 600 and 750). However, an embodiment of the present technology may also be applied to an information processing system wherein the units provided to these information processing apparatuses are configured of multiple devices. For example, an information processing system existing on a network (e.g., cloud computing) may be assumed. Also, an embodiment of the present technology may be applied to a portable radio communication equipment other than a cell-phone unit (e.g., electronic apparatus having a wireless communication function (e.g., game machine, household electrical appliance, music player, video processing apparatus)). Also, an embodiment of the present technology may also be applied to an electronic apparatus whereby wireless communication may be performed by connection to another wireless communication apparatus.

Note that, with the embodiments of the present technology, an example has been illustrated wherein calculated communication quality is displayed on the display unit 210. However, for example, communication quality may be output from an audio output unit (e.g., speaker) of a wireless communication apparatus. For example, there may be output an audio message of "The current communication quality is 4, communication quality of 500 m beyond is 2, and communication quality of 1000 m beyond is 1. We recommend you to perform important communication now." Also, communication quality may be output from an electronic apparatus connected to a wireless communication apparatus (e.g., external audio output apparatus, external display apparatus). In this case, information regarding communication quality is transmitted from the wireless communication apparatus to the electronic apparatus, and communication quality is output from the electronic apparatus thereof.

Note that the above-mentioned embodiments illustrate an example for realizing the present technology, and accordingly, matters in the embodiments and features in the Claims have a correspondence relation, respectively. Similarly, the features in the Claims, and the matters in the embodiments of the present technology denoted with the same name as with the features have a correspondence relation, respectively. However, the present technology is not restricted to the matters in the embodiments, the present technology may be realized by subjecting the embodiments to various modifications without departing from the essence thereof.

Also, the processing procedures described in the above-mentioned embodiments may be regarded as a method having these series of procedures, or may be regarded as a program causing a computer to execute these series of procedures through a recording medium in which the program thereof is stored. There may be employed a hard disk, CD (Compact Disc), MD (MiniDisc), DVD (Digital Versatile Disk), or the like as an example of this recording medium. Also, a memory card, Blu-ray Disc (registered trademark), or the like may be employed.

The present technology may also assume the following configurations.

(1) A mobile device, comprising:
at least one processor configured to perform:
obtaining position information for at least first and second positions of the mobile device along a route;

obtaining communication quality information for at least a third position of the mobile device, the communication quality information calculated based on the route and the obtained position information; and causing the mobile device to display the obtained communication quality information.

(2) The mobile device of (1), wherein the causing comprises:

causing the mobile device to display the obtained communication quality information on a map.

(3) The mobile device of (1), wherein the causing comprises:

causing the mobile device to display the obtained communication quality information together with other information associated with the third position.

(4) The device of (3), wherein the other information associated with the third position comprises location information associated with the third position and/or time information associated with the third position.

(5) The mobile device of (1), wherein the causing comprises:

causing the mobile device to display the obtained communication quality information as text.

(6) The mobile device of (1), wherein obtaining the communication quality information for at least the third position comprises obtaining communication quality information for each of a plurality of positions of the mobile device along the route, and wherein the causing comprises causing the mobile device to display the obtained communication quality information in a time sequence.

(7) The mobile device of (1), wherein the causing comprises:

causing the mobile device to display the obtained communication quality information using color or shading.

(8) The mobile device of (1), wherein obtaining the position information comprises obtaining the position information based on at least one signal received from a global positioning system (GPS).

(9) The mobile device of (1), wherein obtaining the position information comprises obtaining the position information based on at least one signal received from a telecommunications carrier.

(10) The mobile device of (1), wherein the communication quality information for at least the third position comprises information selected from the group consisting of: a received signal strength indicator (RSSI), strength of a pilot signal, strength of a reference signal, signal strength of a beach signal, a channel quality indicator (CQI) corresponding to a signal to noise ratio (SNR), a data rate control (DRC) corresponding to the SNR, a signal to interference ratio (SIR), a signal to interference and noise ratio (SINR), a common pilot channel energy per chip to noise ratio (Ec/No), a common pilot channel energy per chip to noise ratio (Ex/Io), reference signal received power (RSRP), reference signal received quality (RSRQ), and received signal code power (RSCP).

(11) The mobile device of (1), wherein the communication quality information for at least the third position comprises communication quality information for a plurality of telecommunications carriers.

(12) The mobile device of (1), wherein the at least one processor is further configured to perform:

identifying the route from a plurality of routes based at least in part on the first position of the mobile device and the second position of the mobile device.

(13) The mobile device of (12), wherein identifying the route comprises calculating distance between the first position and one or more positions on the route.

(14) The mobile device of (1), wherein obtaining the communication quality information comprises:

accessing, based on the route and the obtained position information, the communication quality information for at least the third position from among communication quality information stored on the mobile device.

(15) The mobile device of (1), wherein obtaining the communication quality information comprises:

receiving the communication quality information from a second device different from the device.

(16) The mobile device of (1), wherein the at least one processor is further configured to perform displaying the communication quality information.

(17) The mobile device of (1), wherein the mobile device comprises an acceleration sensor.

(18) The mobile device of (1), wherein the third position of the mobile device is determined based on the route.

(19) A method, comprising:

using at least one processor to perform:

obtaining position information for at least first and second positions of the mobile device along a route;

obtaining communication quality information for at least a third position of the mobile device, the communication quality information calculated based on the route and the obtained position information; and causing the mobile device to display the obtained communication quality information.

(20) At least one recording medium storing a program that, when executed by at least one computer, causes the at least one computer to perform:

obtaining position information for at least first and second positions of the mobile device along a route;

obtaining communication quality information for at least a third position of the mobile device, the communication quality information calculated based on the route and the obtained position information; and causing the mobile device to display the obtained communication quality information.

(21) An information processing apparatus including: a specifying unit configured to specify, based on a position where a wireless communication apparatus exists, a route of travel of the wireless communication apparatus; and an output control unit configured to output communication quality of wireless communication on the route of travel from the wireless communication apparatus.

(22) The apparatus according to (21), wherein the specifying unit specifies, of routes extracted based on a position where the wireless communication apparatus exists of a plurality of routes, a route headed to a direction of travel of the wireless communication apparatus from a position where the wireless communication apparatus exists as the route of travel; and wherein the output control unit obtains and outputs the communication quality in each position to be situated with a predetermined interval on the route of travel.

(23) The apparatus according to (21), further including: a position information obtaining unit configured to obtain position information including position information for specifying a position where the wireless communication apparatus exists; a location information storage unit configured to store location information for specifying each location to be situated in one or a plurality of routes; a first distance calculating configured to calculate, for each position situated on the route, first distance which is distance between a position where the wireless communication apparatus exists and a location situated on the route, based on the obtained position information, and position information included in the location information; and an extracting unit configured to extract a location regarding which the first distance is the shortest, of locations situated on the route as the nearest location; wherein the specifying unit specifies the route including the extracted nearest location as the route of travel.

(24) The apparatus according to (23), further including: a section information storage unit configured to store section information in which a section of two adjacent locations on the route, and position information for specifying each position in this section are correlated; a second distance calculating unit configured to calculate, based on the obtained position information, and position information according to each position in a section including the extracted nearest location, second distance which is distance between a position where the wireless communication apparatus exists and a position in this section for each position in this section; and a determining unit configured to determine whether or not the wireless communication apparatus exists on the route including the extracted nearest location based on the calculated second distance; wherein the specifying unit specifies a route where the wireless communication apparatus has been determined to exist, as the route of travel.

(25) The apparatus according to (24), wherein the extracting unit extracts a plurality of the different nearest locations based on a plurality of position information obtained at different time of the obtained position information, and position information included in the location information; and wherein the specifying unit specifies a direction of travel of the wireless communication apparatus on a route where the wireless communication apparatus has been determined to exist based on the plurality of extracted different nearest locations, and specifies a route headed to the specified direction of travel from a position where the wireless communication apparatus exists of the route where the wireless communication apparatus has been determined to exist, as the route of travel.

(26) The apparatus according to (24) or (25), wherein the determining unit determines, in the event that at least one of the calculated second distances is short with regard to a threshold, that the wireless communication apparatus exists on the route including the extracted nearest location.

(27) The apparatus according to any of (24) to (26), further including: a communication quality information storage unit configured to store communication quality information in which each position on the route is correlated with the communication quality; wherein the output control unit obtains the communication quality on the route of travel from the communication quality information according to a route where the wireless communication apparatus has been determined to exist, and outputs this to the wireless communication apparatus.

(28) The apparatus according to any of (23) to (27), further including: a distance of travel calculating unit configured to calculate distance of travel of the wireless communication apparatus based on a plurality of position information obtained at different time of the obtained position information; and an acquisition frequency control unit configured to control acquisition frequency of position information obtained by the position information obtaining unit based on the calculated distance of travel.

(29) The apparatus according to any of (22) to (28), further including: a distance of travel calculating unit configured to calculate distance of travel of the wireless communication apparatus based on a plurality of position information obtained at different time of the obtained position information; a type of travel determining unit configured to determine type of a mode of transportation of the wireless communication apparatus based on the calculated distance of travel; and an acquisition frequency control unit configured to control acquisition frequency of communication quality output by the output control unit, based on a determination result determined by the type of travel determining unit.

(30) The apparatus according to any of (21) to (29), wherein the information processing apparatus is the wireless communication apparatus; and wherein the output control unit displays the communication quality on a display unit of the wireless communication apparatus.

(31) The apparatus according to any of (21) to (30), whereon the route is a railroad; and wherein the location is a station.

(32) The apparatus according to any of (21) to (30), whereon the route is a road; and wherein the location is at least one of an intersection, a part or all of an address, a store, a building structure, a bus stop, a historic site, a beauty spot, a park, a river, and a harbor.

(33) A communication system including: an information processing apparatus including a location information storage unit configured to store location information location information including position for specifying each location to be situated in one or a plurality of routes, a section information storage unit configured to store section information in which a section of two adjacent locations on the route, and position information for specifying each location in this section are correlated, a communication quality information storage unit configured to store communication quality information in which each position on the route is correlated with communication quality of wireless communication in this position, and a transmission control unit configured to transmit the location information, the section information, and the communication quality information to a wireless communication apparatus; and a wireless communication apparatus including a position information obtaining unit configured to obtain position information for specifying a position where the wireless communication apparatus exists, a specifying unit configured to specify a route of travel of the wireless communication apparatus based on the location information and the section information transmitted from the information processing apparatus, and the obtained position information, and an output control unit configured to obtain the communication quality on the route of travel from the communication quality information transmitted from the information processing apparatus and to display this on a display unit.

(34) The communication system according to (33), wherein the wireless communication apparatus further includes a communication quality detecting unit configured to detect the communication quality in a position where the wireless communication apparatus exists, and a transmission control unit configured to transmit communication quality information in which the obtained position information and the detected communication quality are correlated to the information processing apparatus; wherein the information processing apparatus further includes an updating unit configured to perform updating of communication quality information stored in the communication quality information storage unit using communication quality information transmitted from the wireless communication apparatus.

(35) An information processing method including: a specifying procedure arranged to specify, based on a position where a wireless communication apparatus exists, a route of travel of the wireless communication apparatus; and an output control procedure arranged to output communication quality of wireless communication on the route of travel from the wireless communication apparatus.

(36) A program causing a computer to execute: a specifying procedure arranged to specify, based on a position where a wireless communication apparatus exists, a route of travel of the wireless communication apparatus; and an output control procedure arranged to output communication quality of wireless communication on the route of travel from the wireless communication apparatus.

The present disclosure contains subject matter related to that disclosed in Japanese Priority Patent Application JP 2012-169475 filed in the Japan Patent Office on Jul. 31, 2012, the entire contents of which are hereby incorporated by reference.

Some embodiments may comprise a non-transitory computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage media) encoded with one or more programs (e.g., a plurality of processor-executable instructions) that, when executed on one or more computers or other processors, perform methods that implement the various embodiments discussed above. As is apparent from the foregoing examples, a non-transitory computer-readable storage medium may retain information for a sufficient time to provide computer executable instructions in a non-transitory form.

It should be understood by those skilled in the art that various modifications, combinations, sub-combinations and alterations may occur depending on design requirements and other factors insofar as they are within the scope of the appended claims or the equivalents thereof.

Use of ordinal terms such as "first," "second," "third," etc., in the claims to modify a claim element does not by itself connote any priority, precedence, or order of one claim element over another or the temporal order in which acts of a method are performed. Such ordinal terms are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

REFERENCE SIGNS LIST

100 Wireless communication apparatus
110 Position information obtaining unit
120 Location information storage unit
130 First distance calculating unit
140 Nearest location and section extracting unit
150 Section information storage unit
160 Second distance calculating unit
170 Existence-on-route determining unit
180 Route of travel specifying unit
190 Communication quality obtaining unit
200 Communication quality information storage unit
210 Display unit
230 Distance of travel calculating unit
240 Acquisition frequency control unit
250 Type of travel determining unit
260 Communication quality acquisition processing control unit
500 Communication system
510 Public telephone network
520 Communication controller
521, 522 Base station
531 to 534 Wireless communication apparatus
600 Information processing apparatus
611 Position information obtaining unit
612 Location information storage unit
613 First distance calculating unit
614 Nearest location and section extracting unit
615 Section information storage unit
616 Second distance calculating unit
617 Existence-on-route determining unit
618 Route of travel specifying unit
619 Communication quality obtaining unit
620 Communication quality information storage unit
621 Transmission control unit
622 Communication unit
700 Wireless communication apparatus
701 Communication quality detecting unit
702 Wireless communication unit
703 Updating unit
750 Information processing apparatus
751 Communication unit
752 Communication quality obtaining unit
753 Route information storage unit
754 Communication quality calculating unit
755 Communication-quality-on-route storage unit
756 Location-information-for-each-route storage unit
757 Section-information-for-each-route storage unit
758 Updating unit
759 Transmission control unit
800 Wireless communication apparatus
801 Communication quality detecting unit
802 Route information storage unit
803 Communication quality calculating unit

The invention claimed is:
1. A mobile device, comprising:
at least one processor configured to perform:
prior to determining a destination of a route,
obtaining first position information for a first position of the mobile device along the route based on a first signal generated by a second device different from the mobile device,
obtaining second position information for a second position of the mobile device along the route based on a second signal generated by the second device, and
determining a mode of transportation for the mobile device based on the first position information and the second position information;
determining a third position of the mobile device using the first position information, the second position information, and the determined mode of transportation, wherein the third position of the mobile device is a future position of the mobile device;
obtaining first communication quality information for at least the third position of the mobile device, the first communication quality information calculated based on the route and the obtained position information;
causing the mobile device to display the obtained first communication quality information;

after causing the mobile device to display the obtained first communication quality information,
determining a fourth position of the mobile device using the second position information and the determined mode of transportation, wherein the fourth position of the mobile device is another future position of the mobile device;
obtaining second communication quality information for at least the fourth position of the mobile device, the second communication quality information calculated based on the route and the obtained fourth position information; and
causing the mobile device to display the obtained second communication quality information.

2. The mobile device of claim 1, wherein the causing comprises:
causing the mobile device to display the obtained communication quality information on a map.

3. The mobile device of claim 1, wherein the causing comprises:
causing the mobile device to display the obtained communication quality information together with other information associated with the third position.

4. The mobile device of claim 3, wherein the other information associated with the third position comprises location information associated with the third position and/or time information associated with the third position.

5. The mobile device of claim 1, wherein the causing comprises:
causing the mobile device to display the obtained communication quality information as text.

6. The mobile device of claim 1, wherein obtaining the communication quality information for at least the third position comprises obtaining communication quality information for each of a plurality of positions of the mobile device along the route, and wherein the causing comprises causing the mobile device to display the obtained communication quality information in a time sequence.

7. The mobile device of claim 1, wherein the causing comprises:
causing the mobile device to display the obtained communication quality information using color or shading.

8. The mobile device of claim 1, wherein the generated signal is received by the mobile device from a global positioning system (GPS).

9. The mobile device of claim 1, wherein the generated signal is received by the mobile device from a telecommunications carrier.

10. The mobile device of claim 1, wherein the communication quality information for at least the third position comprises information selected from the group consisting of:
a received signal strength indicator (RSSI), strength of a pilot signal, strength of a reference signal, signal strength of a beacon signal, a channel quality indicator (CQI) corresponding to a signal to noise ratio (SNR), a data rate control (DRC) corresponding to the SNR, a signal to interference ratio (SIR), a signal to interference and noise ratio (SINR), a common pilot channel energy per chip to noise ratio (Ec/No), a common pilot channel energy per chip to noise ratio (Ex/Io), reference signal received power (RSRP), reference signal received quality (RSRQ), and received signal code power (RSCP).

11. The mobile device of claim 1, wherein the communication quality information for at least the third position comprises communication quality information for a plurality of telecommunications carriers.

12. The mobile device of claim 1, wherein the at least one processor is further configured to perform:
identifying the route from a plurality of routes based at least in part on the first position of the mobile device and the second position of the mobile device.

13. The mobile device of claim 12, wherein identifying the route comprises calculating distance between the first position and one or more positions on the route.

14. The mobile device of claim 1, wherein obtaining the communication quality information comprises:
accessing, based on the route and the obtained position information, the communication quality information for at least the third position from among communication quality information stored on the mobile device.

15. The mobile device of claim 1, wherein obtaining the communication quality information comprises:
receiving the communication quality information from the second device different from the mobile device.

16. The mobile device of claim 1, wherein the at least one processor is further configured to perform displaying the communication quality information.

17. The mobile device of claim 1, wherein the mobile device comprises an acceleration sensor.

18. The mobile device of claim 1, wherein the third position of the mobile device is determined based on the route.

19. The mobile device of claim 1, wherein the fourth position is determined using the second position information and the first position information.

20. The mobile device of claim 1, wherein the fourth position is determined using the second position information and the third position information.

21. A method, comprising:
using at least one processor to perform:
prior to determining a destination of a route,
obtaining first position information for a first position of a mobile device along the route based on a first signal generated by a second device different from the mobile device,
obtaining second position information for a second position of the mobile device along the route based on a second signal generated by the second device and
determining a mode of transportation for the mobile device based on the first position information and the second position information;
determining a third position of the mobile device using the first position information, the second position information, and the determined mode of transportation, wherein the third position of the mobile device is a future position of the mobile device;
obtaining first communication quality information for at least the third position of the mobile device, the first communication quality information calculated based on the route and the obtained position information;
causing the mobile device to display the obtained first communication quality information;
after causing the mobile device to display the obtained first communication quality information,
determining a fourth position of the mobile device using part the second position information and the determined mode of transportation, wherein the fourth position of the mobile device is another future position of the mobile device;

obtaining second communication quality information for at least the fourth position of the mobile device, the second communication quality information calculated based on the route and the obtained fourth position information; and causing the mobile device to display the obtained second communication quality information.

22. At least one non-transitory computer-readable storage medium storing a program that, when executed by at least one computer, causes the at least one computer to perform:

prior to determining a destination of a route,
obtaining first position information for a first position of a mobile device along the route based on a first signal generated by a second device different from the mobile device, obtaining second position information for a second position of the mobile device along the route based on a second signal generated by the second device, and determining a mode of transportation for the mobile device based on the first position information and the second position information;

determining a third position of the mobile device using the first position information, the second position information, and the determined mode of transportation, wherein the third position of the mobile device is a future position of the mobile device;

obtaining first communication quality information for at least the third position of the mobile device, the first communication quality information calculated based on the route and the obtained position information;

causing the mobile device to display the obtained first communication quality information;

after causing the mobile device to display the obtained first communication quality information, determining a fourth position of the mobile device using the second position information and the determined mode of transportation wherein the fourth position of the mobile device is another future position of the mobile device;

obtaining second communication quality information for at least the fourth position of the mobile device, the second communication quality information calculated based on the route and the obtained fourth position information; and causing the mobile device to display the obtained second communication quality information.

\* \* \* \* \*